(12) United States Patent
Loretan et al.

(10) Patent No.: US 10,863,248 B2
(45) Date of Patent: *Dec. 8, 2020

(54) CONTENT NAVIGATION GUIDE

(71) Applicant: Comcast Interactive Media, LLC, Philadelphia, PA (US)

(72) Inventors: Thomas Loretan, Philadelphia, PA (US); Kevin Mercer, Philadelphia, PA (US); Jill Mclaughlin, Philadelphia, PA (US); Aparna Ramchandran, Philadelphia, PA (US); Katherine Inglis, Philadelphia, PA (US); Arpit Mathur, Philadelphia, PA (US); Jesse Mullen, Philadelphia, PA (US); Meredith Kenney, Philadelphia, PA (US); Dheyvi Velagapudi, Philadelphia, PA (US)

(73) Assignee: Comcast Interactive Media, LLC, Philadelphia, PA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/666,221

(22) Filed: Aug. 1, 2017

(65) Prior Publication Data

US 2018/0084311 A1 Mar. 22, 2018

Related U.S. Application Data

(63) Continuation of application No. 12/771,738, filed on Apr. 30, 2010, now Pat. No. 9,762,975.

(51) Int. Cl.
*H04N 21/81* (2011.01)
*H04N 21/443* (2011.01)
*H04N 21/482* (2011.01)
*G06F 3/0481* (2013.01)
*G06F 3/0482* (2013.01)
(Continued)

(52) U.S. Cl.
CPC ....... *H04N 21/8153* (2013.01); *G06F 3/0481* (2013.01); *G06F 3/0482* (2013.01); *G06F 3/04817* (2013.01); *H04N 21/4438* (2013.01); *H04N 21/482* (2013.01); *G06F 16/54* (2019.01); *G11B 27/34* (2013.01)

(58) Field of Classification Search
CPC .......... H04N 21/8153; H04N 21/4438; H04N 21/482; H04N 1/00453; H04N 1/00442; G06F 3/0482; G06F 3/04817; G06F 3/0481; G06F 16/54; G11B 27/34
See application file for complete search history.

(56) References Cited

U.S. PATENT DOCUMENTS 5,920,313 A 7/1999 Diedrichsen et al.
7,080,394 B2 7/2006 Istvan et al.
(Continued)

OTHER PUBLICATIONS

CA Design Application No. 137718, Application for Registration of an Industrial Design, Examiner's Report, dated Nov. 17, 2010.

*Primary Examiner* — Tuyetlien T Tran
(74) *Attorney, Agent, or Firm* — Banner & Witcoff, Ltd.

(57) ABSTRACT

A program guide, such as an electronic program guide (EPG), may be used to display information regarding upcoming scheduled transmissions of content. The display may include thumbnail images for selected groups of programs, and the images may be positioned in a pseudo-random location, and moved along a randomly generated trajectory on the display.

20 Claims, 23 Drawing Sheets

(51) Int. Cl.
*G06F 16/54* (2019.01)
*G11B 27/34* (2006.01)

(56) References Cited

U.S. PATENT DOCUMENTS

| | | | |
|---|---|---|---|
| D559,855 S | 1/2008 | Sato et al. | |
| D576,173 S | 9/2008 | Oshiro et al. | |
| D593,116 S | 5/2009 | Garcia et al. | |
| D599,364 S | 9/2009 | Mays | |
| D599,365 S | 9/2009 | Brown et al. | |
| D599,367 S | 9/2009 | Mays et al. | |
| D599,368 S | 9/2009 | Kanga et al. | |
| D599,806 S | 9/2009 | Brown et al. | |
| D601,156 S | 9/2009 | Motohashi | |
| 7,590,948 B2 | 9/2009 | Narita et al. | |
| D603,415 S | 11/2009 | Lin et al. | |
| D608,365 S | 1/2010 | Walsh et al. | |
| D611,053 S | 3/2010 | Kanga et al. | |
| D611,484 S | 3/2010 | Mays et al. | |
| D611,485 S | 3/2010 | Marashi | |
| 7,681,149 B2 | 3/2010 | Lahdesmaki | |
| 7,761,812 B2 | 7/2010 | Ostojic et al. | |
| D625,323 S | 10/2010 | Matsushima et al. | |
| 7,873,972 B2 * | 1/2011 | Zaslavsky | H04N 21/4316 348/333.05 |
| 7,941,758 B2 | 5/2011 | Tremblay | |
| 8,015,490 B2 | 9/2011 | Ogikubo | |
| 8,253,747 B2 * | 8/2012 | Niles | G06T 13/20 345/419 |
| 2003/0001907 A1 | 1/2003 | Bergsten et al. | |
| 2003/0007015 A1 | 1/2003 | Laffey et al. | |
| 2003/0007017 A1 | 1/2003 | Laffey et al. | |
| 2004/0036711 A1 | 2/2004 | Anderson | |
| 2004/0261103 A1 | 12/2004 | Ohno et al. | |
| 2005/0125826 A1 | 6/2005 | Hunleth et al. | |
| 2005/0223340 A1 | 10/2005 | Repka | |
| 2006/0155576 A1 * | 7/2006 | Deluz | G16H 40/63 705/2 |
| 2006/0228096 A1 * | 10/2006 | Hoshino | G11B 27/326 386/234 |
| 2007/0083824 A1 * | 4/2007 | Yun | H04N 5/44543 715/788 |
| 2007/0130545 A1 | 6/2007 | Mochizuki et al. | |
| 2008/0077863 A1 | 3/2008 | Jong et al. | |
| 2009/0094518 A1 * | 4/2009 | Lawther | G06F 3/04817 715/716 |
| 2009/0113307 A1 | 4/2009 | MacKenzie | |
| 2009/0119583 A1 | 5/2009 | Kihara et al. | |
| 2009/0153389 A1 * | 6/2009 | Kerr | H04N 5/44513 341/176 |
| 2009/0313267 A1 * | 12/2009 | Girgensohn | G06F 16/44 |
| 2010/0005418 A1 | 1/2010 | Miyazaki et al. | |
| 2010/0037179 A1 | 2/2010 | Ito | |
| 2010/0146446 A1 | 6/2010 | Ahn et al. | |
| 2010/0175031 A1 * | 7/2010 | Alton | G06F 16/748 715/841 |
| 2010/0201692 A1 * | 8/2010 | Niles | G06T 13/20 345/473 |
| 2010/0333005 A1 | 12/2010 | Tanaka et al. | |
| 2011/0161852 A1 | 6/2011 | Vainio et al. | |

\* cited by examiner

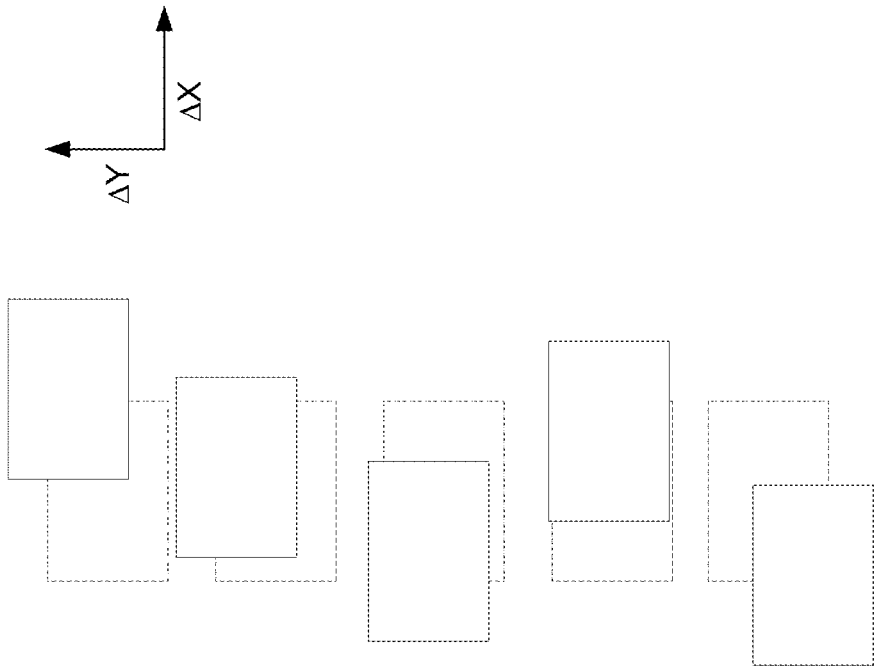

CONTENT NAVIGATION GUIDE

CROSS REFERENCE TO RELATED APPLICATIONS

This application is a continuation of U.S. patent application Ser. No. 12/771,738, filed Apr. 30, 2010, entitled "CONTENT NAVIGATION GUIDE", which is incorporated herein by reference.

FIELD OF ART

The features described herein generally relate to accessing scheduled transmissions of content, such as video programs.

BACKGROUND

As long as content providers continue to transmit their content according to a schedule, there will be viewers wondering when that content will be transmitted and available for viewing. In the past, content providers and system operators have provided television content viewers with electronic program guides (EPGs) to provide listings of television programs. The listings may list the programs according to the channels on which they appear, and by the time of day, often providing viewers with a grid of text listing the program titles.

Although many have grown accustomed to using such text grid program guides, there is always a need to make a program guide better, such as by presenting more information, more relevant information, making it easier to use, etc.

SUMMARY

Features described herein relate generally to an improved program guide. In some embodiments, the program guide, which may be an electronic program guide, may be generated by selecting a subset of video programs according to a transmission schedule, selecting a thumbnail image for each of the subset of programs, generating a different random initial position and a random motion vector for each thumbnail, and displaying and moving the thumbnail images according to their motion vectors. In some embodiments, the various motion vectors may share a common origin.

In some embodiments, a thumbnail image may be selected by hovering a pointer over it, and a group of thumbnail images (including the selected one) may be aligned while the remaining thumbnails outside of the group may be displayed in a random unaligned order, and may be moved along different random motion vectors (which may be the same as used before the thumbnail selection).

In some embodiments, the motion of the thumbnails may be restricted to a boundary, and upon reaching the boundary, the thumbnails may reverse their direction of motion.

The various features described above may be implemented using a computer or processing device, which may operate by executing computer-executable instructions for performing the various features described. Accordingly, some embodiments herein include the computer-readable media storing those instructions. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIGS. 3a-g illustrates an example program guide that can be used with features described herein.

DETAILED DESCRIPTION

Figure 1:
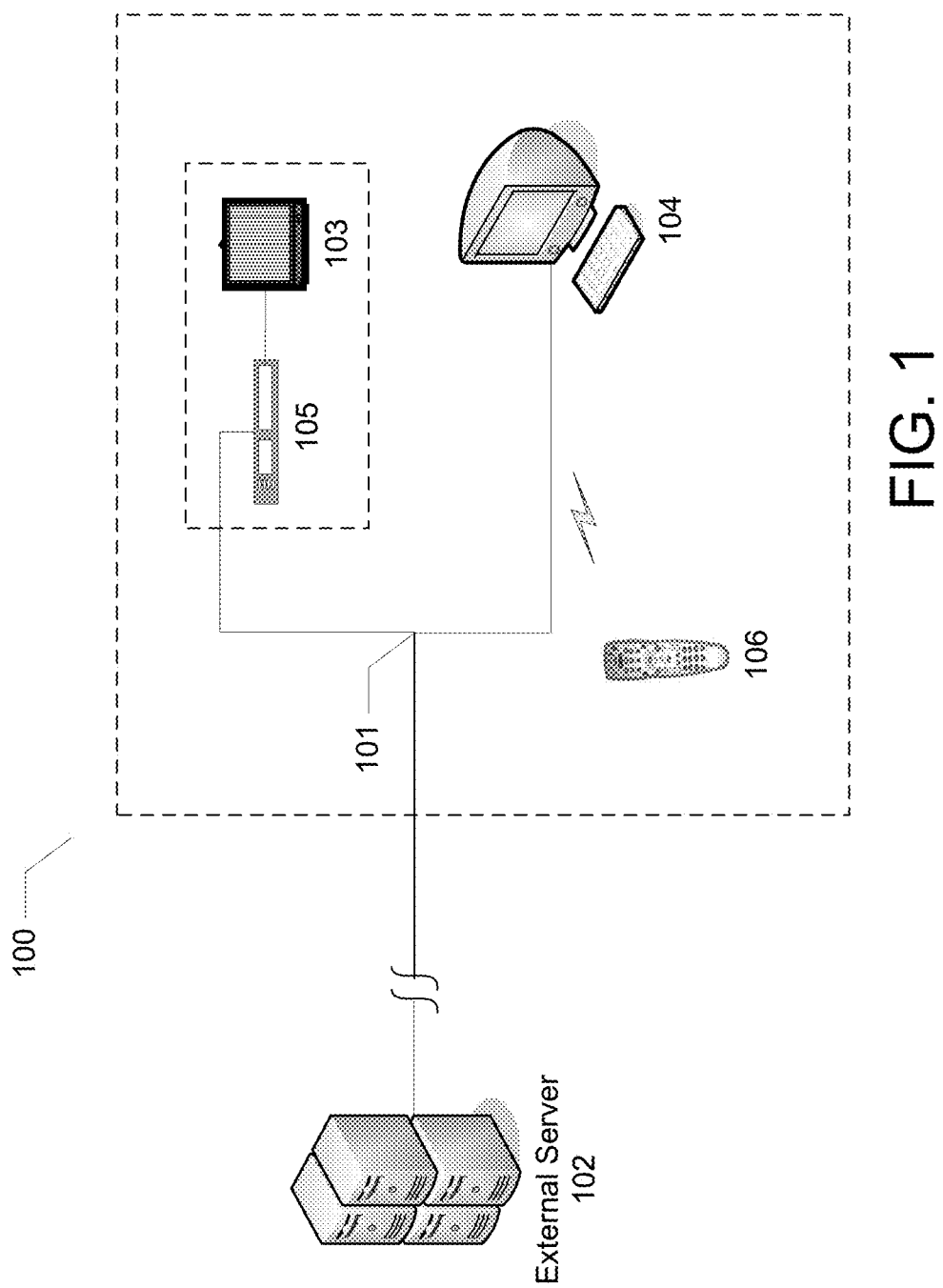
FIG. 1 illustrates an example information or content distribution network on which various features herein may be implemented.

FIG. 1 illustrates an example premises or household 100. The household may include an in-home communication network 101, which can be coaxial wiring, Ethernet wiring, fiber optic wiring, telephone line wiring, wireless, or any other desired mode of communication.

The network 101 may be used by a variety of devices in the home to communicate with a device outside of the home, such as an external server 102. The external server 102 may be, for example, a television content provider's headend or central office, a fiber optic node, a component such as a DOCSIS CMTS (Data Over Cable Service Interface Specification, Cable Modem Termination System), a server on the Internet, a satellite node, wireless node, or any other desired source of information to which devices in the home 100 may be connected.

Within the home 100, one type of device that can use the network 101 is a display device, such as a television 103 or personal computer 104. For example, users in the home may watch television programs on television 103 or personal computer 104.

The television, or other display devices, may be directly connected to the network 101, or they may be connected using a video interface device, such as a decoder, a digital video recorder (DVR), or set-top box (STB) 105. Although illustrated separately from television 103 the interface device 105 may be integral with the display device/television. Additionally, although STBs are used as examples in the discussion herein, the interface/display device may be any type of device, such as a gateway, personal computer (PC) devices, mobile television devices, portable media devices, cell phones, etc. Personal computer 104 may contain a network interface used to communicate on network 101 and with external server 102. FIG. 1 also illustrates an example wireless remote control 106, which the user may use to interact with the interface devices, personal computers, and/or televisions.

Figure 2:
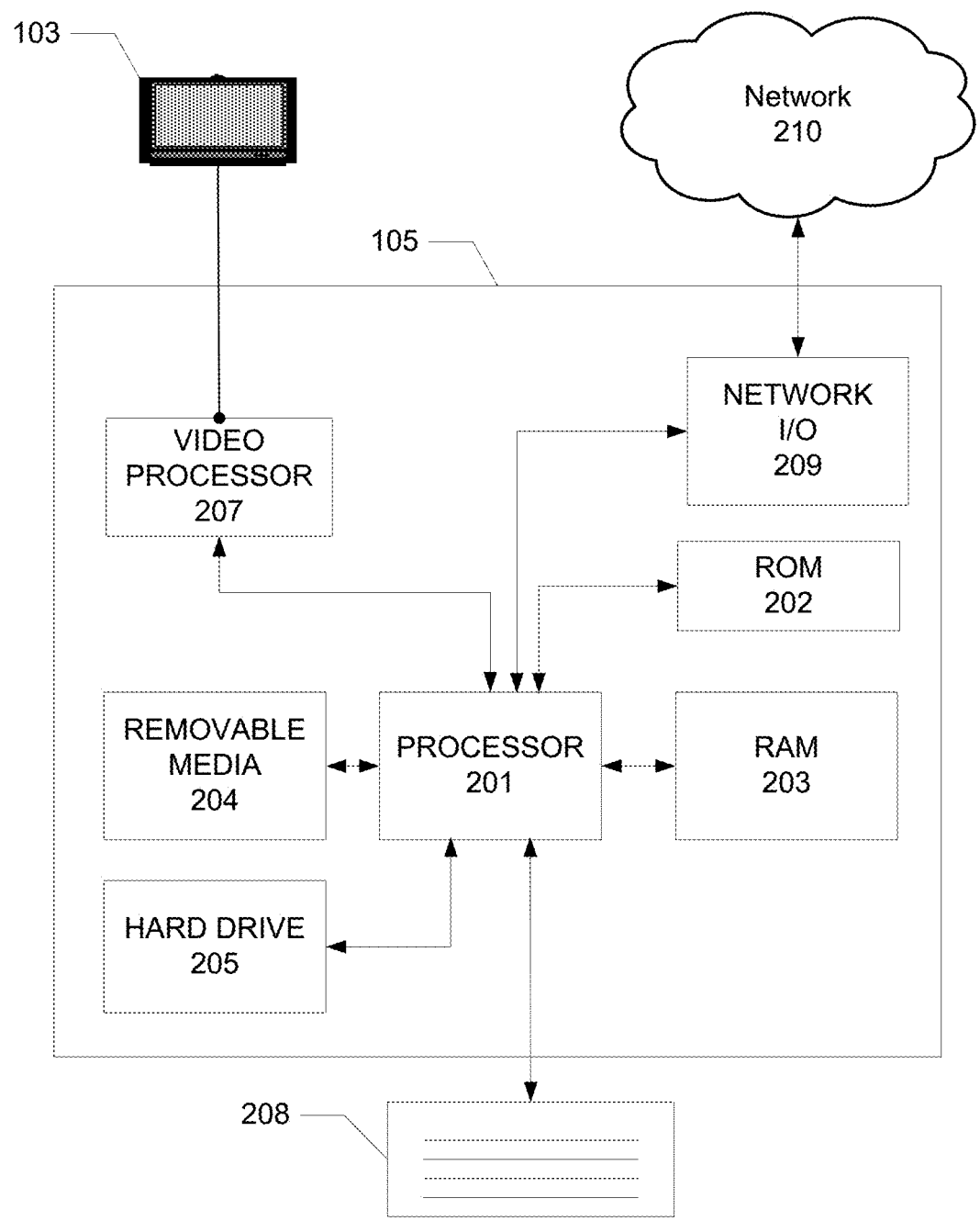
FIG. 2 illustrates an example computing device configuration that can be used to implement the various devices described herein.

FIG. 2 illustrates the general hardware elements of an example video interface device 105, which may simply be any type of computing device such as an STB, digital video recorder (DVR), personal computer, mobile device, circuit embedded into the viewing device, etc. The device 105 may include one or more processors 201, which may execute instructions of a computer program to perform any of the features described herein. Those instructions may be stored in any type of computer-readable medium or memory, to configure the operation of the processor 201. For example, instructions may be stored in a read-only memory (ROM)

202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The device 105 may include one or more output devices, such as an external television 103 (or device 105 may be combined with television 103 or personal computer 104), and may include one or more output device controllers 207, such as a video processor. There may also be one or more user input devices 208, such as a remote control, keyboard, mouse, touch screen, microphone, etc. The device 105 may also include one or more network input/output circuits 209, such as a modem and/or network card to communicate with an external server 102 over network 210. The network interface may be a wired interface, wireless interface, or a combination of the two. In some embodiments, the interface 209 may include a modem, and network 210 may include an in-home network 101, and/or a television system's coaxial, fiber, or hybrid fiber/coaxial distribution system (e.g., a DOCSIS network). Various types of modems, such as an optical fiber modems, may also be used.

The network input/output device 209 may include tuning and decoding circuitry to receive and decode various datastreams. The datastreams may be analog channels such as NTSC television channels, or digital channels such as DOCSIS data channels, MPEG (Moving Pictures Experts Group) datastreams, IP (Internet Protocol) data streams, optical datasreams, etc.

The video interface device 105 may allow a viewer to select content that is available from a provider, for example via the server 102, and can tune to and/or decode a datastream carrying that content upon request (e.g., a video on demand VOD application). The content can be presented for viewing on a display device, such as a television 103 or personal computer 104. The datastream may also carry additional data, such as EPG data, transmitted from the external server 102 to the interface device 105 as a broadcast, multicast and/or unicast stream.

Figure 3A:
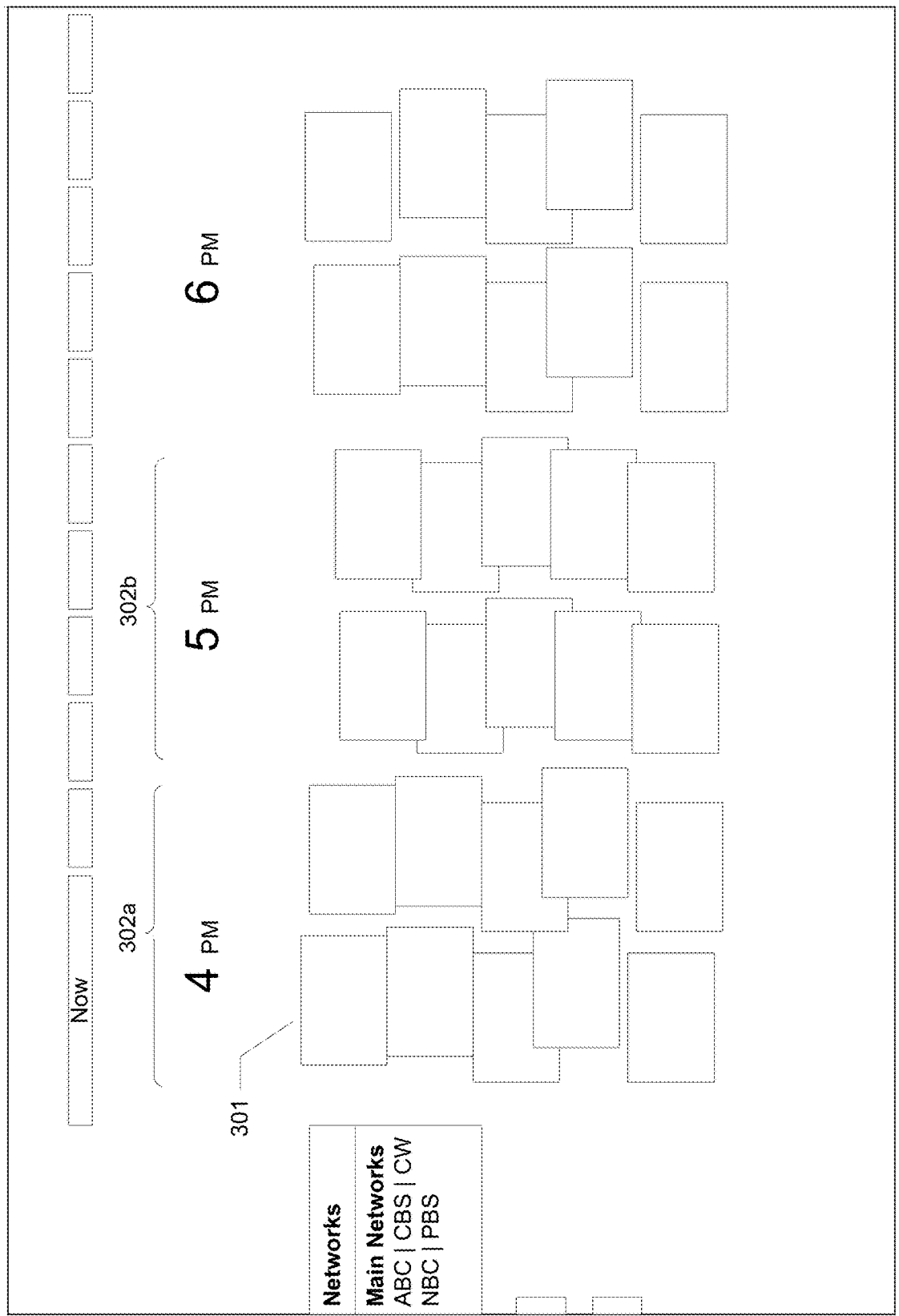

FIG. 3*a* illustrates an example program guide 300 whose data (e.g., which may include computer program instructions for generating the displays, as well as the objects/text/images/sounds used to populate the displays) can be carried in the datastream. The program guide 300 may include a plurality of thumbnail images 301 for various items of content that are available to the user. The content may be any desired type of informational content, such as a video program, television show, movie, music video, song, picture, Internet page, or any other desired video, audio, or audio-visual content. The thumbnail image for an item of content may include any desired visual image used to represent the content. For example, a thumbnail for a television show might include a screenshot from the show, pictures of the show's main character(s), the show's logo, an advertisement still, etc.

When the program guide 300 is initially opened, the thumbnails 301 may be arranged in a pseudo-random order. The pseudo-random order may place the thumbnails 301 generally in order based on their scheduled transmission time. For example, thumbnails for programs that are to be transmitted in the 4 pm hour may be placed in a first area 302*a* of the screen, and thumbnails for programs that are to be transmitted in the 5 pm hour may be placed in a second area 302*b* of the screen. The areas may be, as illustrated in FIG. 3*a*, vertical columns that are horizontally arranged in chronological order.

The specific ordering may be pseudo-random, however, in that the various thumbnails need not be aligned within their respective areas of the screen. For example, as illustrated in FIG. 3*a*, the thumbnails for the 4 pm shows appear generally in the 4 pm area 302*a*, but they are misaligned. This misalignment may be made randomly (or pseudo-randomly, for those who consider computer-generated random numbers to not truly be random) using a computer's random number generator (e.g., a hardware component or software program, which may generate random values based on a clock signal, time of day, etc.). For example, and as illustrated in FIGS. 3*b-c*, an aligned position for each thumbnail (shown in FIG. 3*b*) may be adjusted with X- and/or Y-coordinate offsets that are randomly generated, to result in actual positions (shown in FIG. 3*c*). The random offsets may be positive or negative, and may be different for some (or all) of the thumbnails. For example, neighboring thumbnails may have different offsets in both the X- and Y-axis. These offsets may be limited, so that the thumbnails still appear within the areas 302*a,b* of their time segment. Displaying the thumbnails with these offsets may be more visually appealing to, and easier to view by, the user.

Figure 3D:
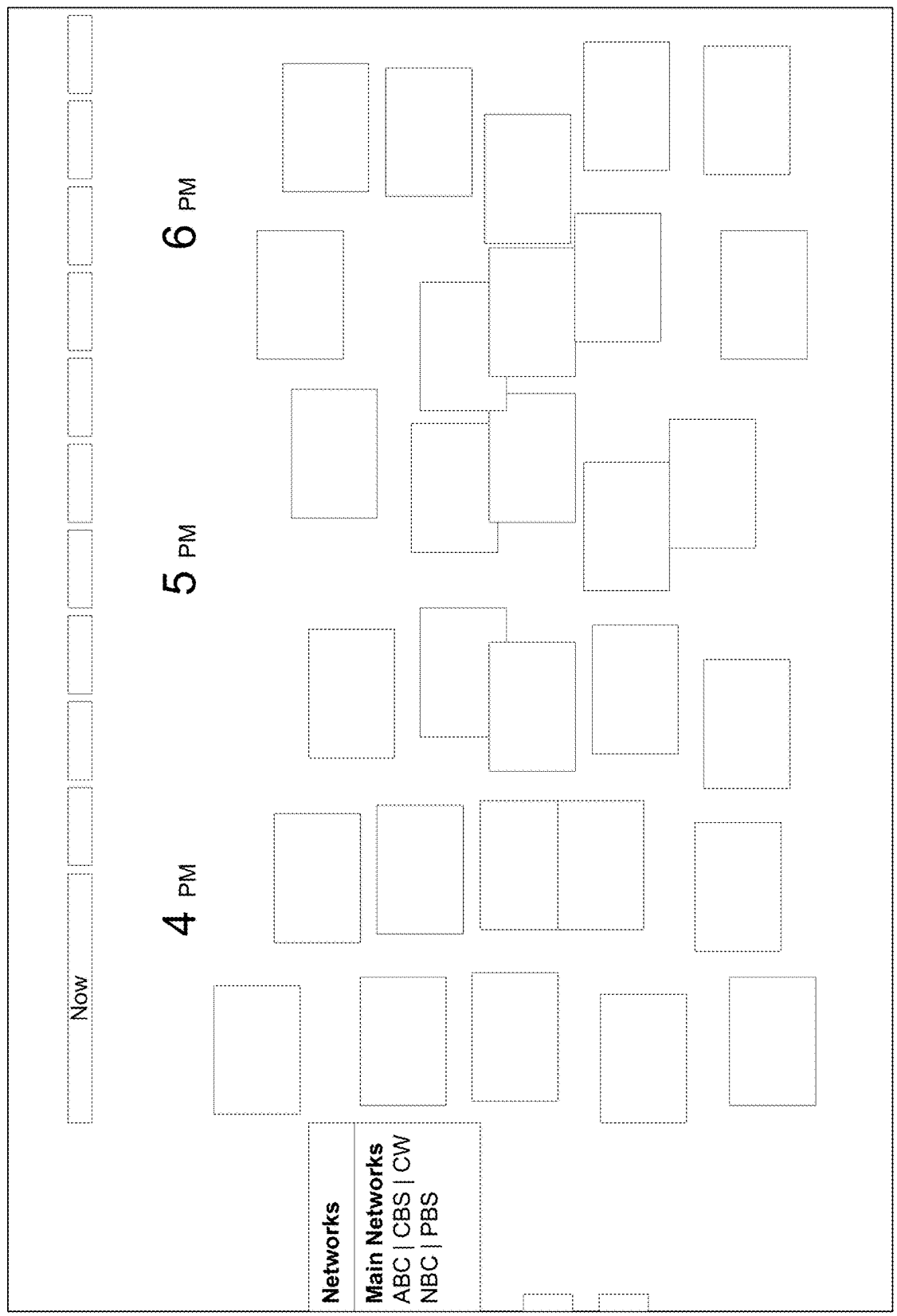

Once the program guide 300 is displayed, and the thumbnails 301 displayed in their initial positions, the program guide 300 may then animate the display to cause the thumbnails 301 to drift, moving around in the display area. FIG. 3*d* shows an example of how the thumbnails 301 may move from their initial positions to different positions as part of this drifting. This movement may also be randomly generated for each thumbnail. The random generation can be performed on-the-fly, as the thumbnail movement is needed or desired. Alternatively, the random generation can be performed in advance, and can simply be retrieved when thumbnail movement is needed or desired. In some embodiments, a preset number of motion vectors (discussed below) may be generated for the program guide display, and those preset vectors may simply be randomly assigned to different thumbnails when the thumbnail movement is needed or desired.

Figure 3E:
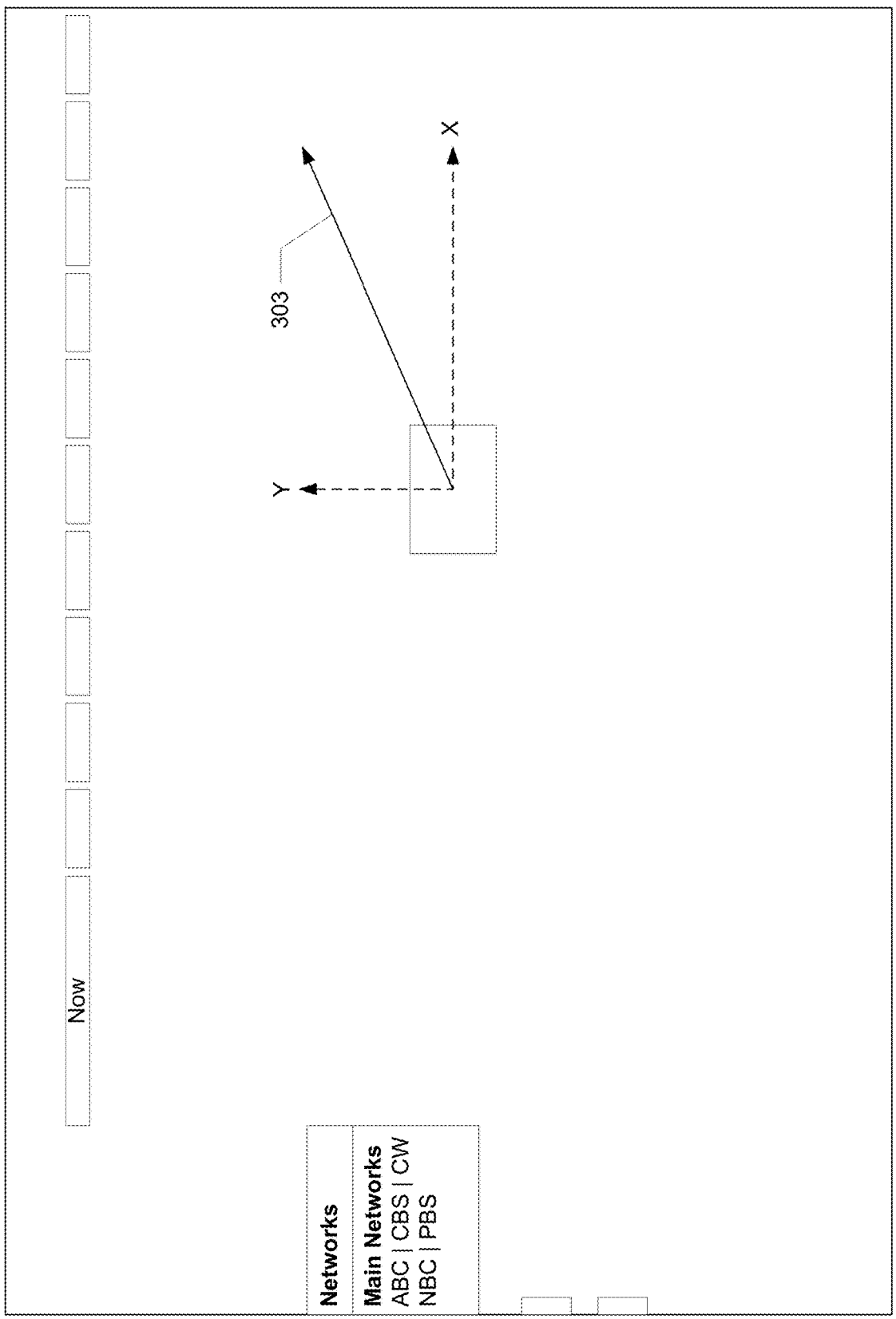

As illustrated in FIG. 3*e*, each thumbnail may be assigned a motion vector 303 having X- and Y-axis speed components. The speed components may be randomly generated (e.g., a random X-axis pixel speed, and a random Y-axis pixel speed), and may be limited. For example, a maximum speed may be defined (e.g., 45 pixels/second in the Y direction, 60 pixels/second in the X direction), and a random number may be generated to assign random speed components in the two directions. For three-dimensional displays, a random speed component in the third dimension may also be generated.

Figure 3F:
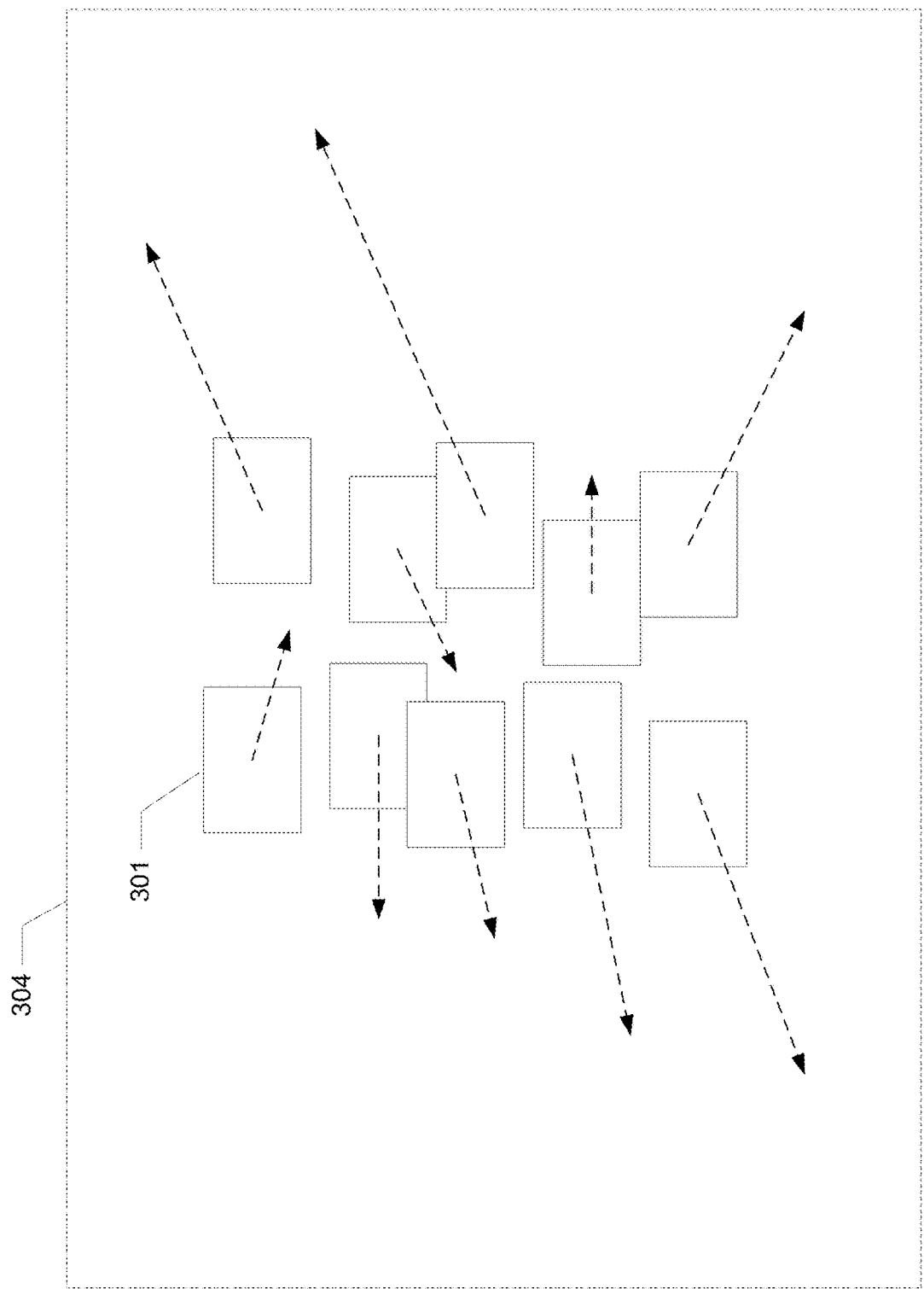

As illustrated in FIG. 3*f*, the various thumbnails 301 may each be assigned different, random motion vectors. For example, neighboring thumbnails may have different motion vectors. During display of the program guide, the thumbnails 301 may be animated to move along their respective vectors at their respective vector speeds, giving the appearance of drifting across the screen. This drifting may help keep users engaged in the program guide, more so than with static program guides.

To prevent the thumbnails from interfering with other user interface elements on the screen, their movement may be bounded by a boundary 304. The boundary 304 need not be displayed (although it can if desired), but when a thumbnail 301 intersects with the boundary 304 during movement, the computing device generating the program guide may generate a new motion vector for the thumbnail 301. The new motion vector may be the opposite of the thumbnail's original vector. So, for example, if a thumbnail's original vector was a motion +5 pixels/sec in the X direction, and +3 pixels/sec in the Y direction, the new vector may be −5 pixels/sec in the X direction, and −3 pixels/sec in the Y direction. The thumbnail may move along this new vector until it reaches its original starting point, and at that time its vector may be reversed again, and the movement continued back along the original vector.

Figure 3G:
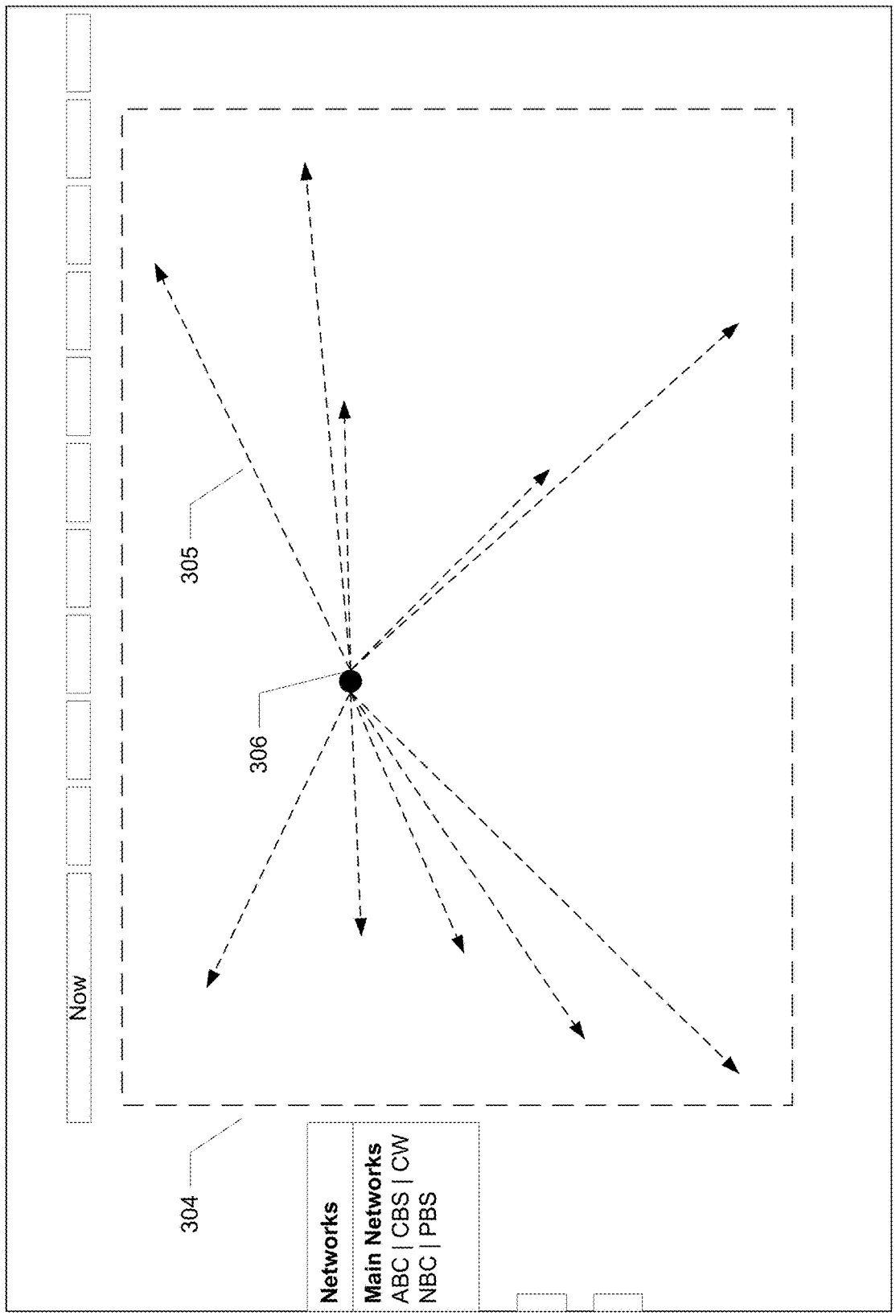

In some embodiments, the motion vectors may share a common origin point or area of the screen. The FIG. 3g example illustrates vectors 305 for the various thumbnails, where the vectors 305 originate at a common point or area 306 of the screen. The point 306 may be a single pixel location on the screen, or it may simply be a point within (or on the perimeter of) a larger area, such as a centralized circle 306. Having a common origin point or area may help make the program guide more immersive.

Figure 4A:
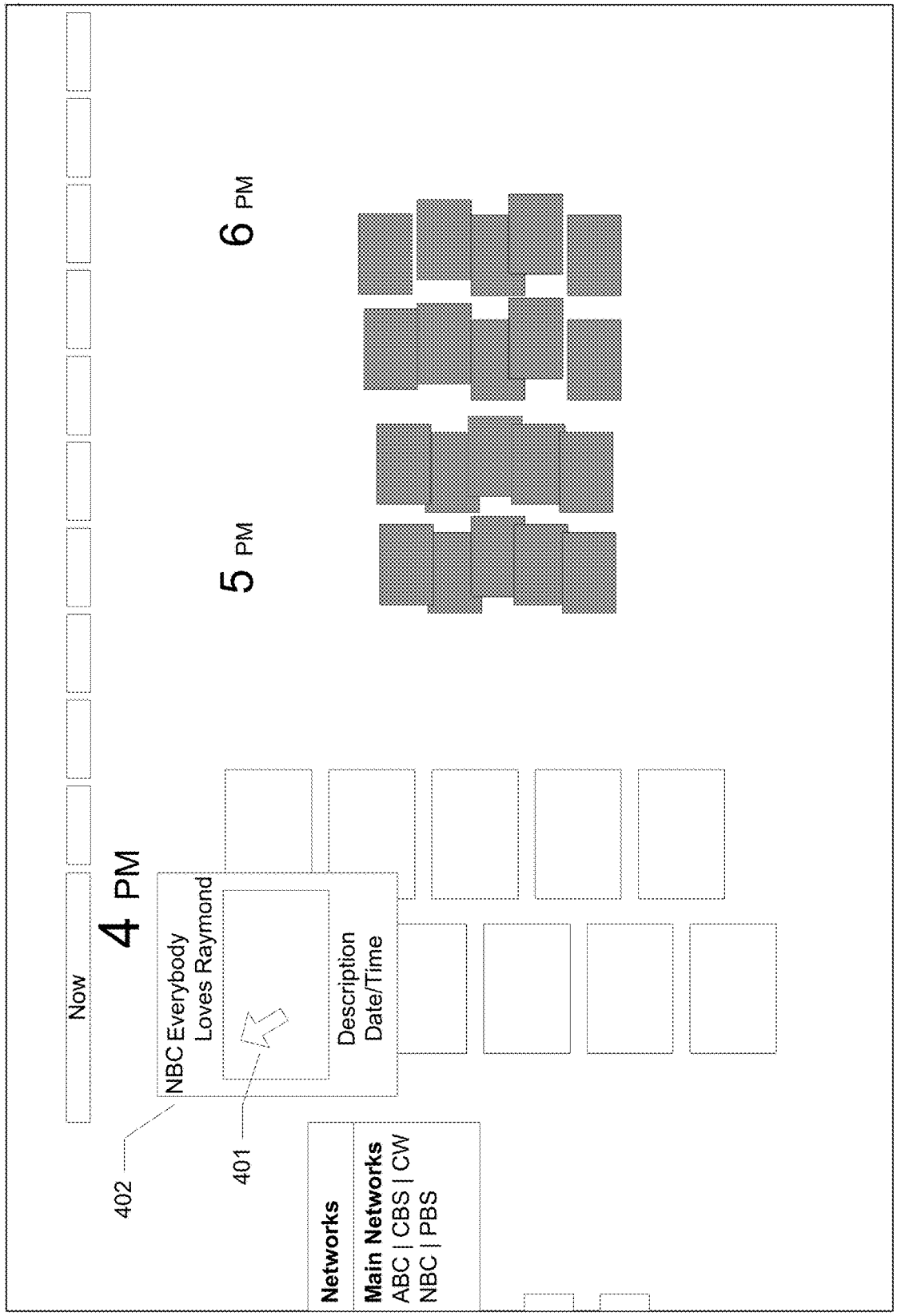
FIGS. 4a-d illustrate additional aspects of an example program guide.

The motion of the thumbnails 301 may continue until a thumbnail is selected. Selecting a thumbnail may be made by, for example, hovering a mouse pointer over a thumbnail. FIG. 4a illustrates an example in which a pointer 401 is hovering over a selected thumbnail 402. Other types of selection, such as moving a highlight cursor with arrow keys on a remote control, may be made as well. For example, a selected thumbnail or menu element may be highlighted (e.g., with a different color, size, shape, etc.), and pressing UP/DOWN/LEFT/RIGHT arrow keys on a remote control 106 may cause the highlighting to shift to neighboring thumbnails or menu elements.

Several things may happen when a thumbnail is selected. For example, the selected thumbnail 402 may be enlarged, adding a title for the thumbnail's corresponding program. The program provider (e.g., "NBC"), a textual description, and/or start time and date may also be displayed. As another example, the various thumbnails in the same group as the selected thumbnail may be aligned, and they may cease their drifting movement along their respective motion vectors. The group may be time-based, such as the programs being transmitted in the 4 pm hour.

Figure 4B:
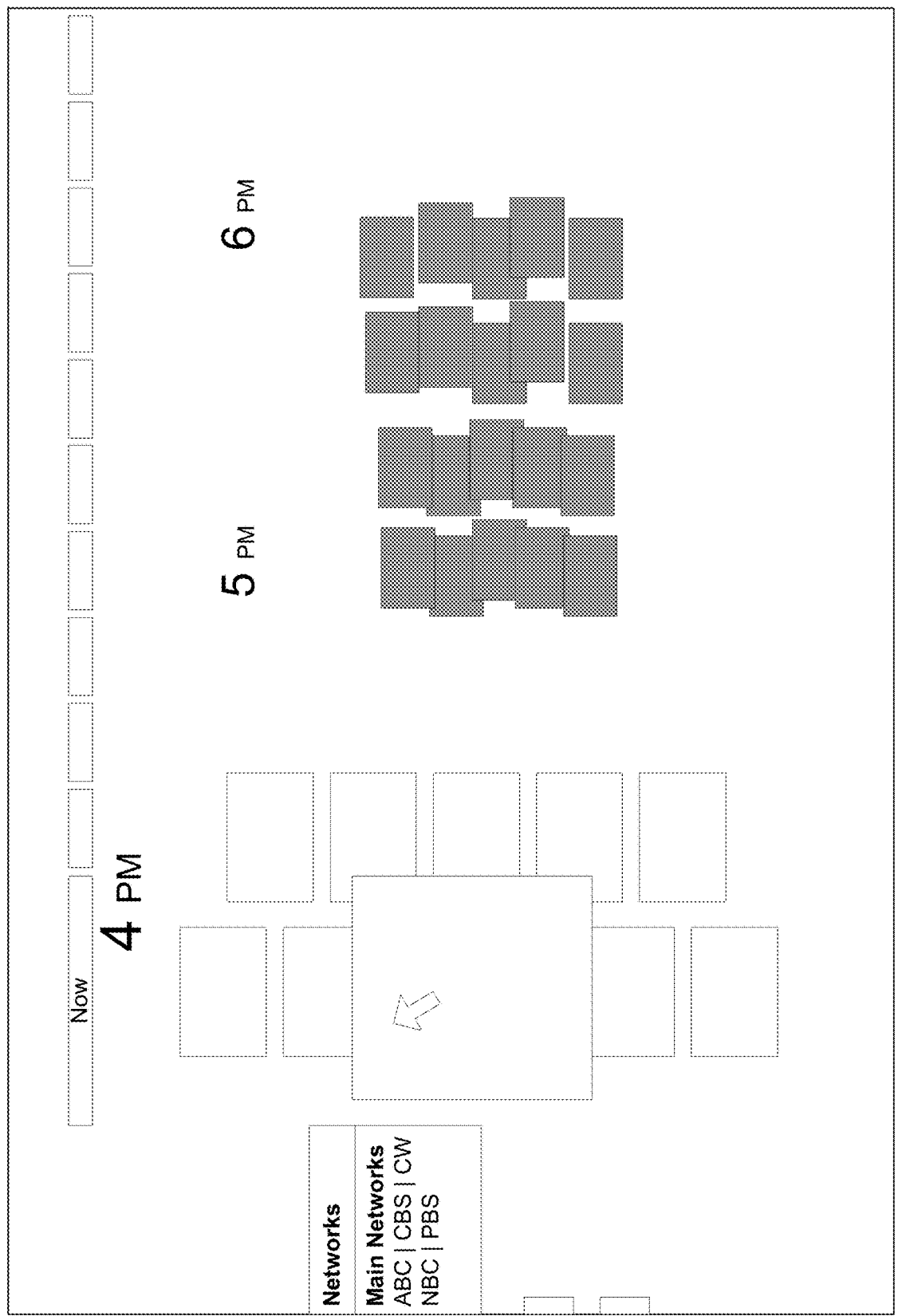
Figure 4C:
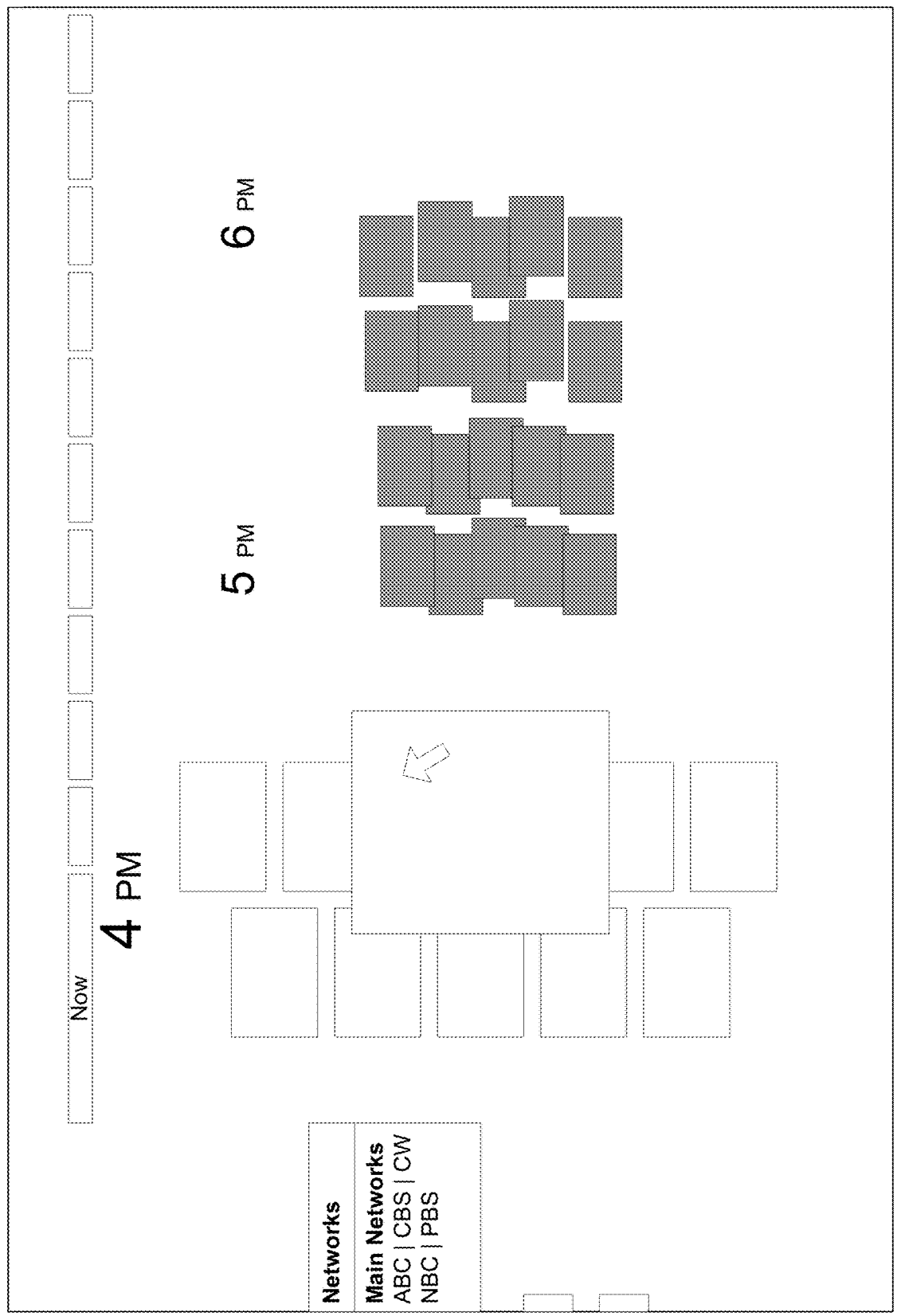

Moving the pointer 401 to select (e.g., hovering over) different thumbnails may cause the corresponding thumbnails to enlarge with similar title/description/source/time/date information for the other programs, as illustrated in FIG. 4b. The other thumbnails in the group may remain aligned, although they may be shifted to remain visible behind the enlarged thumbnail. Selecting a thumbnail in a different column may result in enlargement of the other column of thumbnails, as illustrated in FIG. 4c.

The thumbnails that are not in the selected group may have their appearance changed as well. They may be shrunken, and they may have their colors changed to a darker shade to appear more in the background. They may have their motion vectors recalculated, or they may simply be returned to their original starting positions, and they may continue to move as described before. This resetting of their position and/or motion may be performed each time a different thumbnail is highlighted or selected.

Figure 4D:
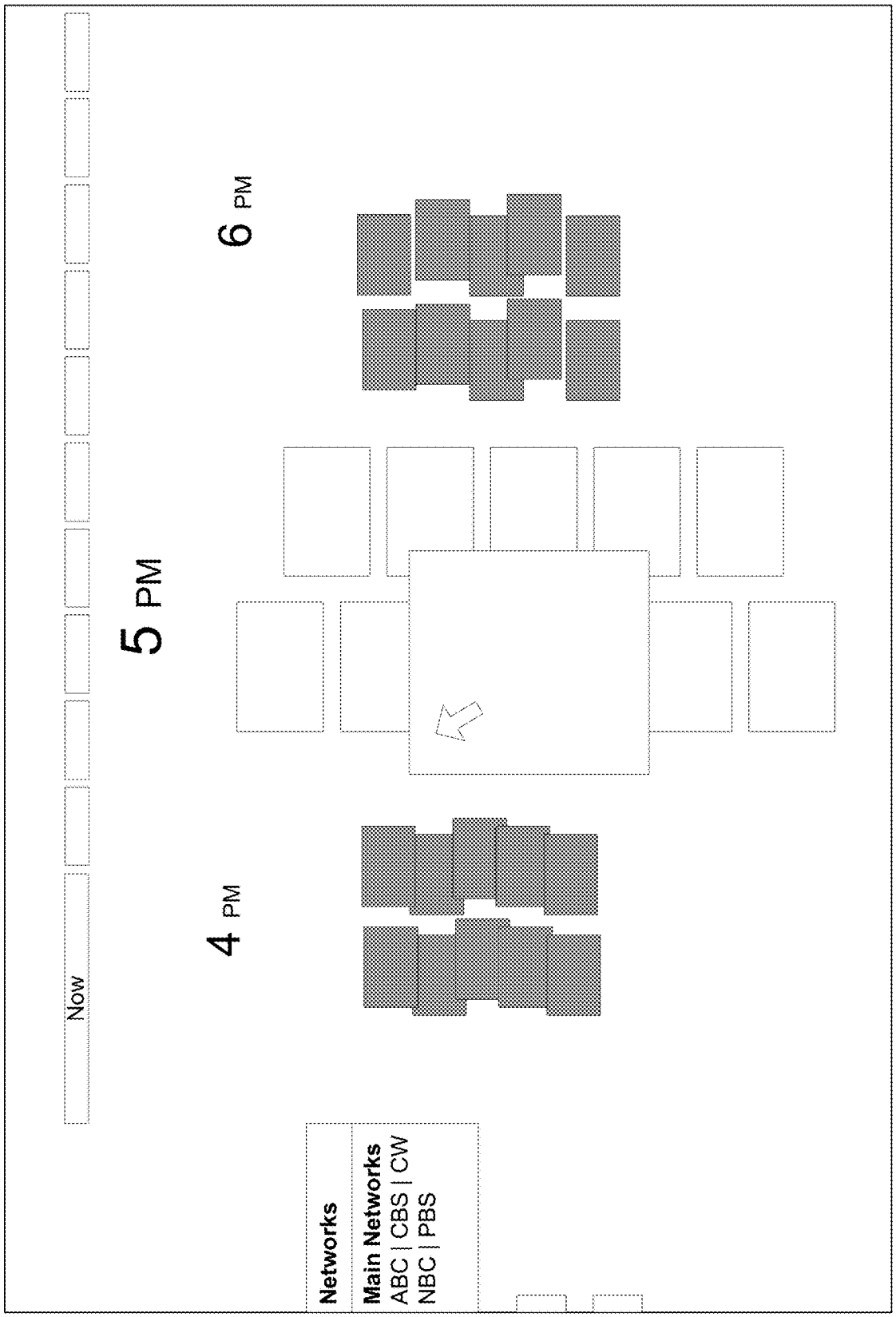

The enlargement of the selected thumbnail and alignment of the selected group's thumbnails may be performed each time a thumbnail in a different group is selected. FIG. 4d illustrates an example of this, with the cursor hovering over a thumbnail in the 5 pm group of thumbnails.

Figure 5:
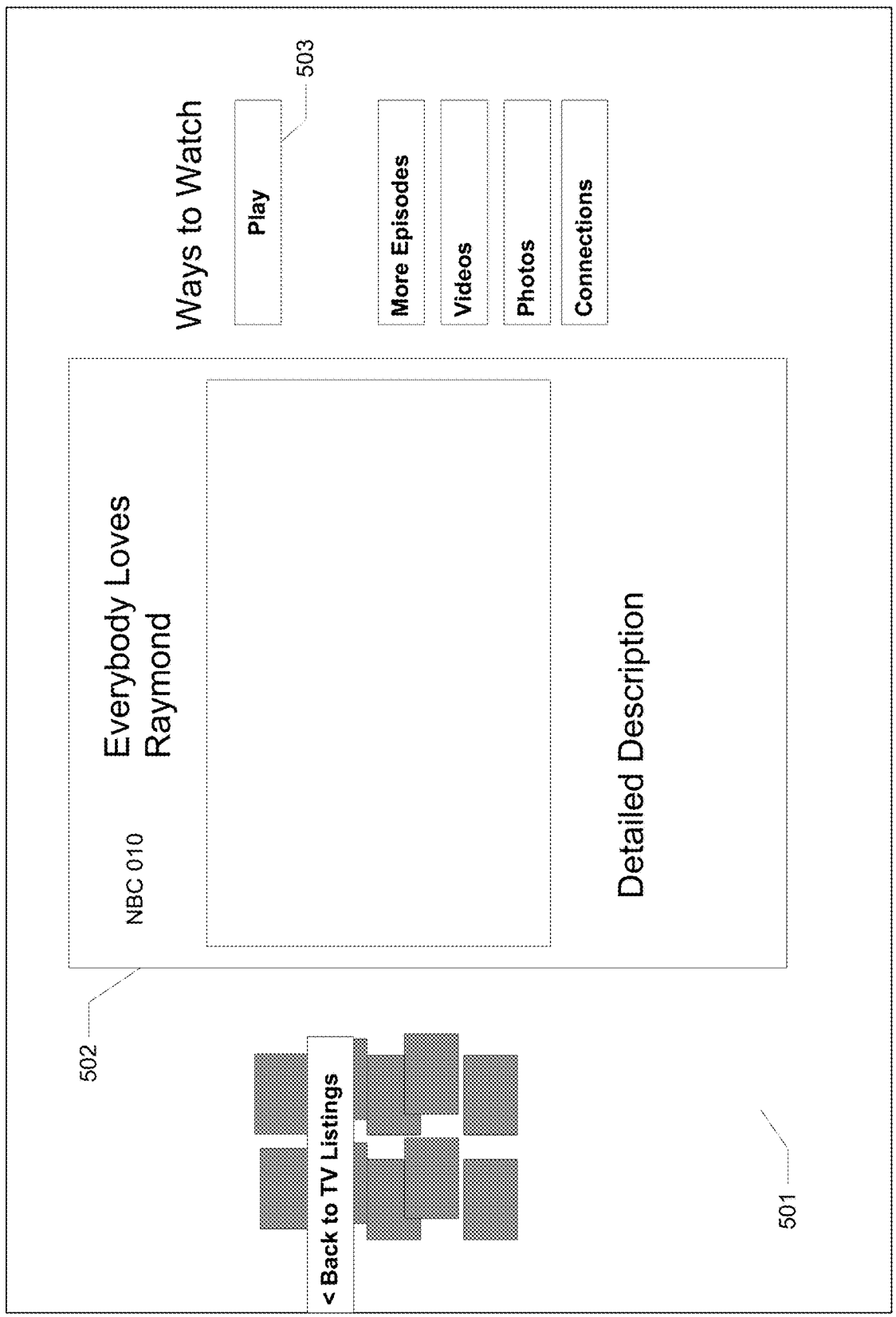
FIG. 5 illustrates an example detail screen for a selected thumbnail.

When a user makes a further selection of a thumbnail, such as by pressing a mouse button with the thumbnail enlarged, a new screen may be displayed. FIG. 5 illustrates an example of this new screen 501. The new screen 501 may contain a further enlarged version of the selected thumbnail 502, with additional information, such as a longer text description, additional air times, additional content provider identification, etc. The viewer may be presented with different options 503 for viewing the selected program. For example, the user could choose to immediately begin viewing a unicast stream of the program if the program is available on demand, or immediately begin tuning to a stream (e.g., station channel, digital datastream, etc.) carrying the program if it is currently being aired, or schedule a future recording of the program. A recording may be scheduled using the program guide, to take effect at a remote device. For example, a user can access the program guide from a personal computer, make a selection for recording, and the selection may be transmitted to a remote server on the Internet. The server can then communicate with a server that handles communication with the user's own digital video recorder (DVR), and may transmit a recording command and schedule to the user's DVR.

Additional options may be presented as well. For example, the user can be given the option to choose to see a listing of additional air times for the selected program, or to view a listing of alternative episodes of the same series (e.g., a different episode of the television situation comedy "Everybody Loves Raymond"). Another option may be to see a selection of videos, photographs, or other content that may be available on the Internet for the show, such as newspaper articles about the show or its stars, interviews, paparazzi photos on various web sites, etc. These additional options may aggregate information from a variety of different networks and platforms, such as different Internet sites, television content providers, multiple system operators, etc.

Another option may be to see a listing of contextually related programs. For example, various programs may be tagged with keywords or contexts (e.g., based on their title, their genres, their subject matter descriptions, their actors, their directors, etc.), and the program guide may provide a listing of other programs that may be related by these keywords or contexts.

Figure 6A:
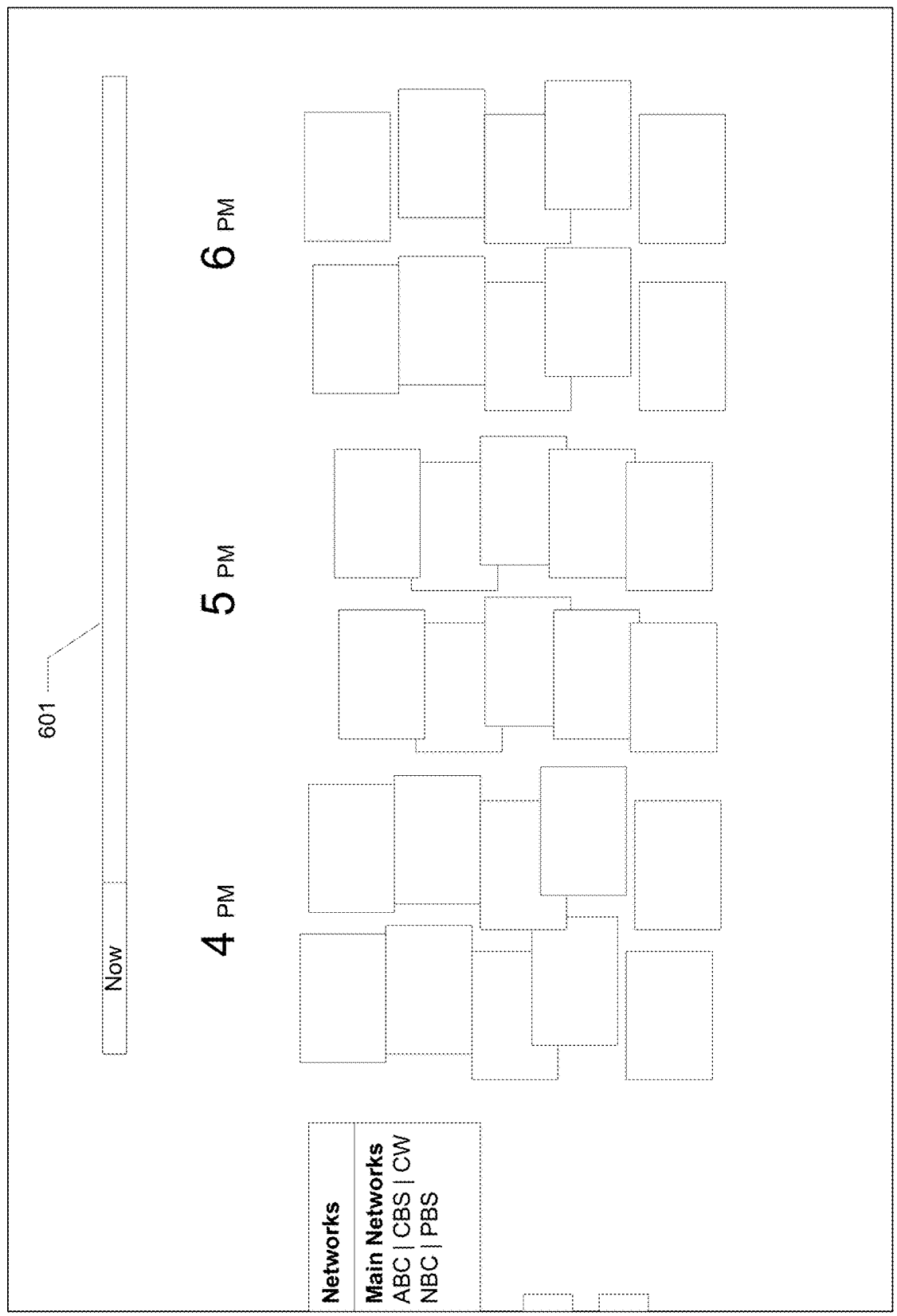
FIGS. 6a-c illustrate example timeline features of an example program guide.

FIG. 6a illustrates the program guide, with emphasis on a timeline feature 601. The timeline 601 may be a line representing a predetermined amount of time for the EPG. For example, the timeline 601 may represent a 24-hour period beginning with the current hour. In an unselected state (e.g., without hovering the pointer over the timeline 601), the timeline 601 may simply display a label indicating that the displayed thumbnails are for a current time period. For example, the program guide 301 shows thumbnails for a 3-hour period.

Figure 6B:
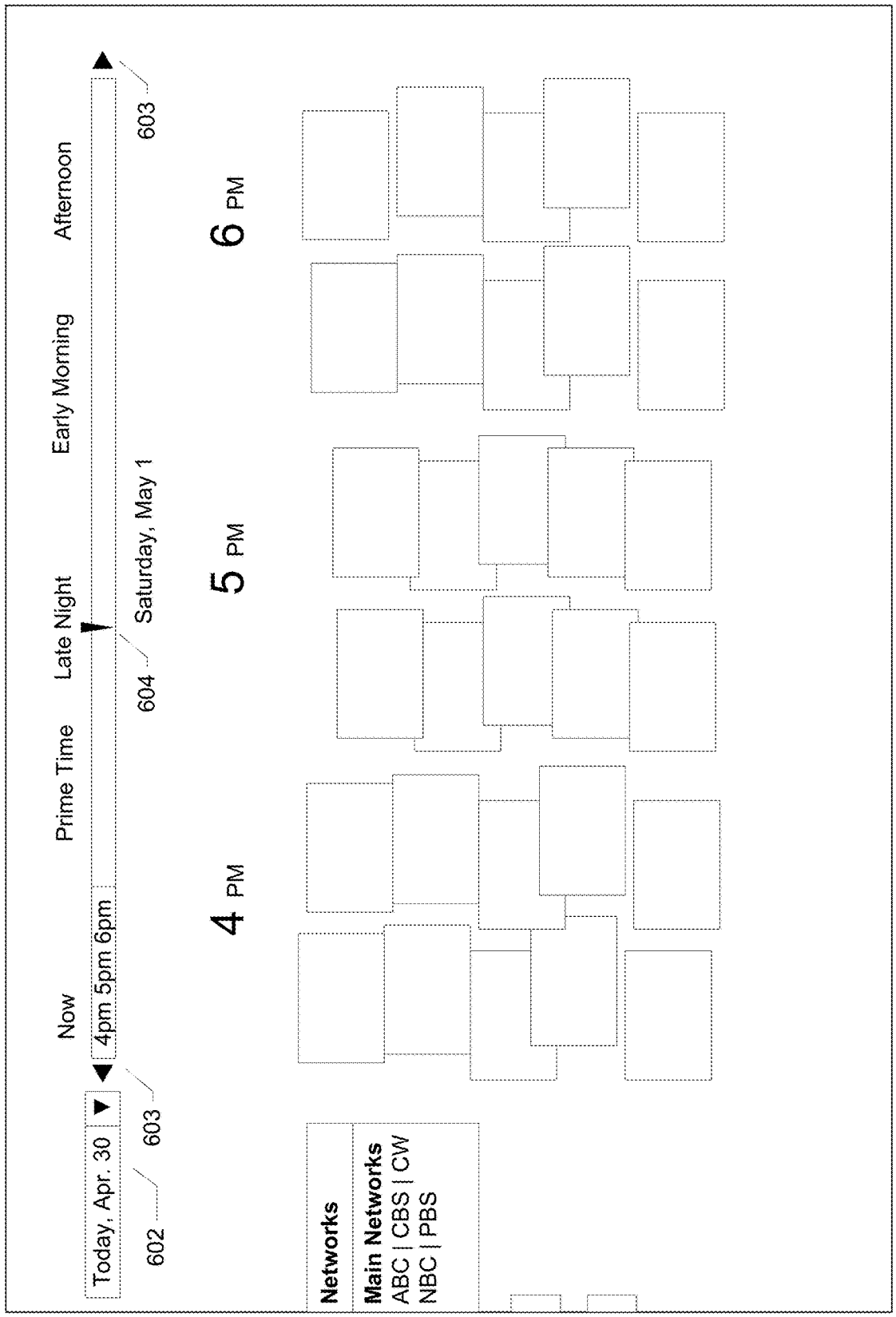

By selecting the timeline 601, or hovering a pointer over it, the timeline 601 may change, to add information detailing the time range being displayed. For example, the specific displayed times may be listed (e.g., 4 pm, 5 pm and 6 pm), and time ranges may be identified for the current time ("Now"), Prime Time, Late Night, Early Morning, Afternoon, etc. FIG. 6b illustrates the timeline 601 with this additional information. The changes can include the addition of elements, such as a date drop-down selection box 602. The selection box 602 may allow the user to choose a different date for viewing the guide. Upon selection of a different date, the timeline 601 can show the listings for that date, beginning at any desired time (e.g., at the current time, or at midnight, etc.). If the new listings begin at midnight, the "Now" label may be replaced with the "12 AM" (or "Midnight") labeling (not shown). The timeline 601 may also add navigation arrows 603, which may allow the user to advance (or decrement) the listing time by a set amount (e.g., an hour) to quickly scroll through the other times of day for the listings. To help orient the user, the timeline may also include a date demarcation 604, marking the next day, and include the date.

Figure 6C:
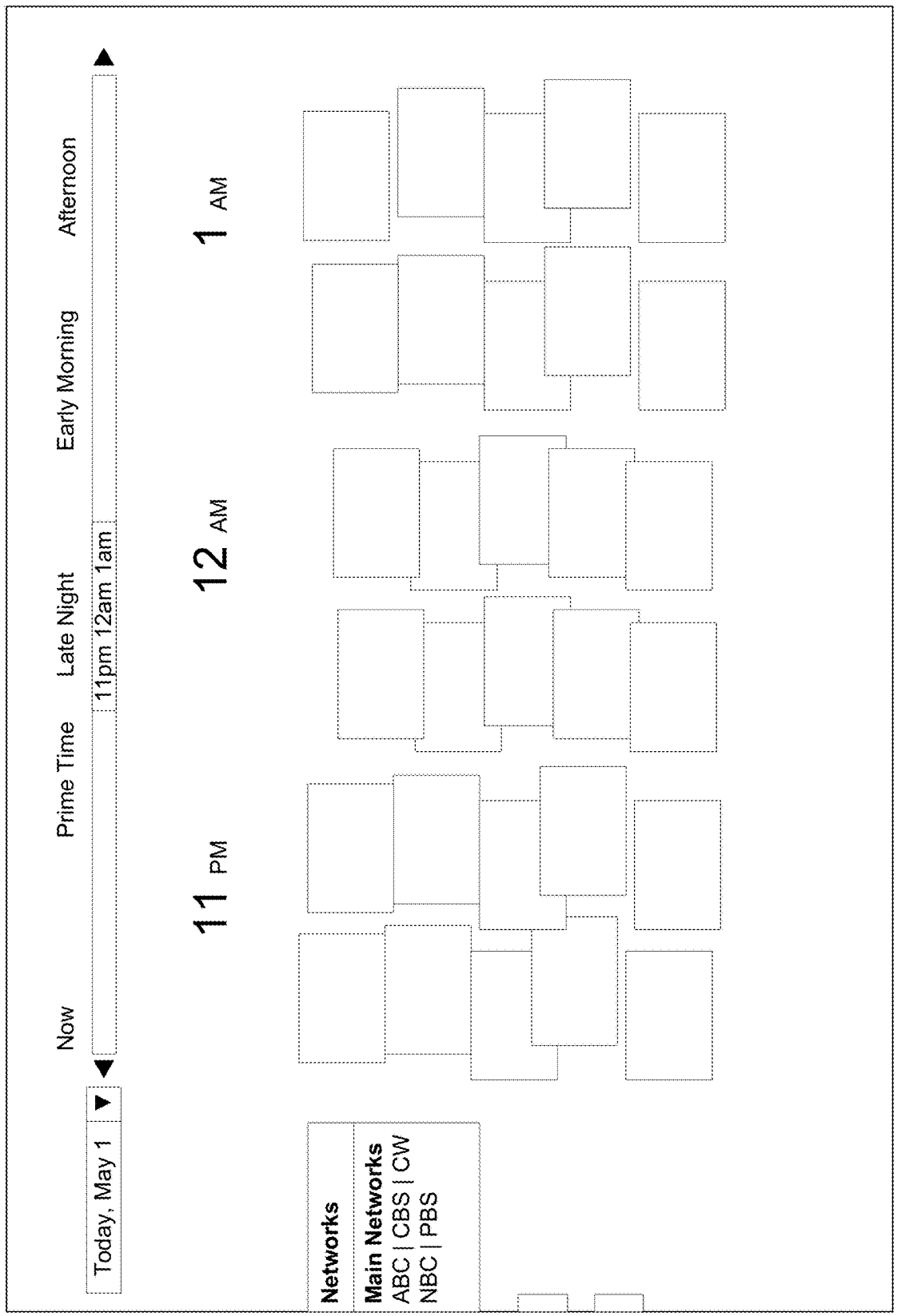

Selection of a different point along the timeline 601 may result in the display of thumbnails for a different time segment. FIG. 6c illustrates an example in which the pointer (not shown) has been positioned over the "Late Night" portion of the timeline 601, and the thumbnails illustrated correspond to programs appearing in the Late Night time range. To assist the user in positioning the pointer, the timeline 601 may be segmented according to predefined time segments (e.g., an hour). Segments are omitted from FIG. 6c, but FIG. 3a illustrates example segments.

The discussion above regarding FIGS. 6a-c illustrates how different time segments can be viewed in the program guide 301. The available content can be displayed, or filtered, using any desired criteria, such as time, category, service provider, or any other collection of criteria. FIGS. 7a-f illustrate how different content providers (e.g., service providers, television stations, cable network stations, etc.) can be listed by filtering the overall available contents by content provider criteria. On the left-hand side of the program guide in FIG. 7a, a source listing menu 701 may be displayed. The source listing menu 701 may list the content providers whose thumbnails appear in the current display of thumbnails.

Figure 7A:
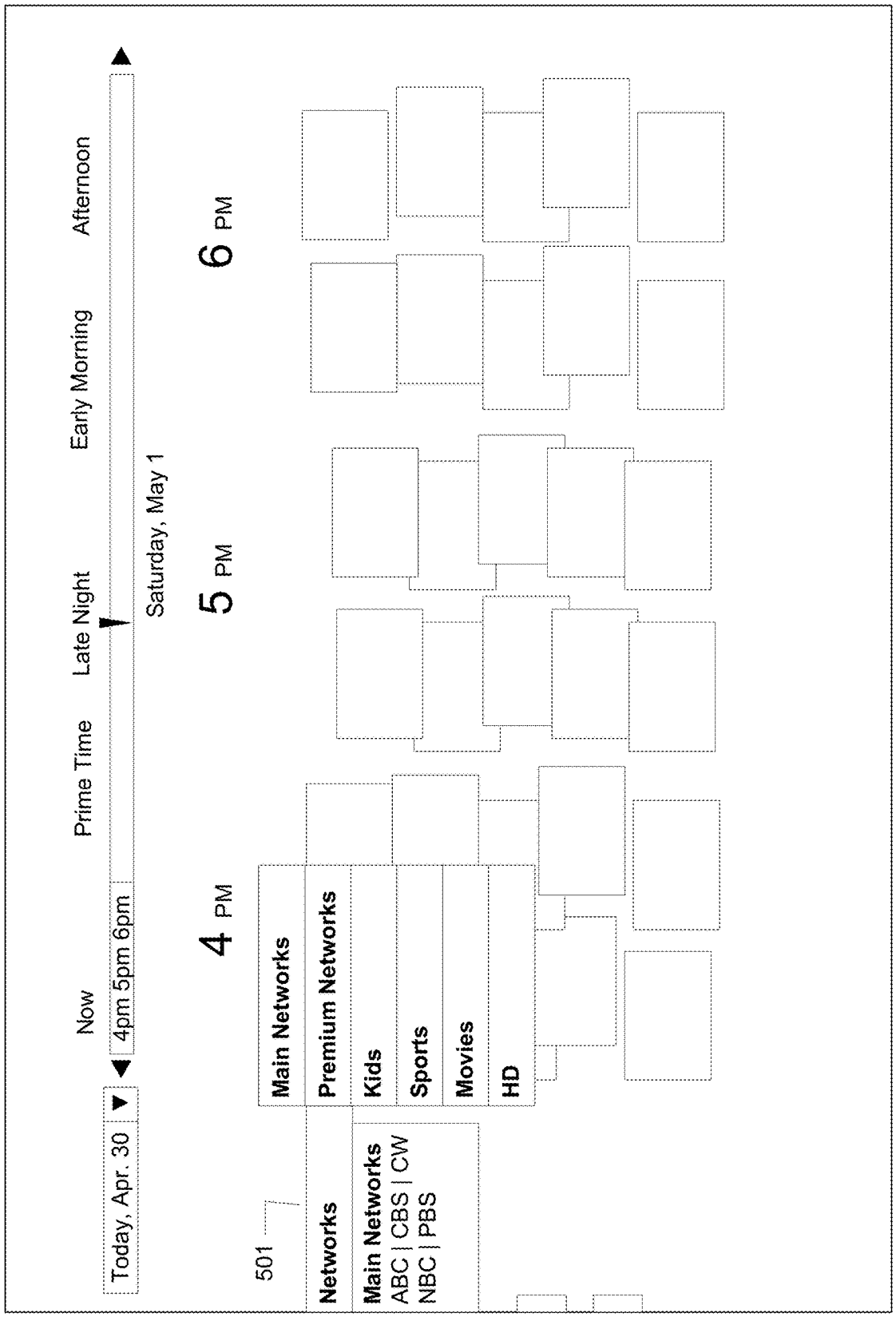
FIGS. 7a-f illustrate example user interface elements and operation of an example program guide.

For example, the FIG. 7a screen includes a "Networks" source listing menu 701. The menu 701 may list the content providers, in this case television channels ABC, CBS, CW, NBC and PBS. Those television channels may be in a predefined "Main Networks" group of providers, and multiple different other groups of providers can be defined as well. For example, FIG. 7a illustrates an expansion of the "Networks" label, with options to select other listing groups, such as "Premium Networks." Other groups can be defined according to other criteria, such as a categorization of the content. The FIG. 7a example shows several categories: "Kids," "Sports," "Movies," and "HD." Selecting one of these other groups may cause the EPG to filter the displayed thumbnails to only include content matching the criteria of the defined group. So, for example, the "Kids" group might only list thumbnails for programs that are suitable for children (as specified in program guide listing information), while the "Sports" group might only list thumbnails for sporting events. The groups can be defined by any category, including the display technology that is needed (or preferred) for the content. So, for example, different groups can be created for resolution types (e.g., standard, high-definition 720 p, high-definition 1080 p) and display types (e.g., two-dimensional, three-dimensional polarized, three-dimensional active shutter, etc.).

Figure 7B:
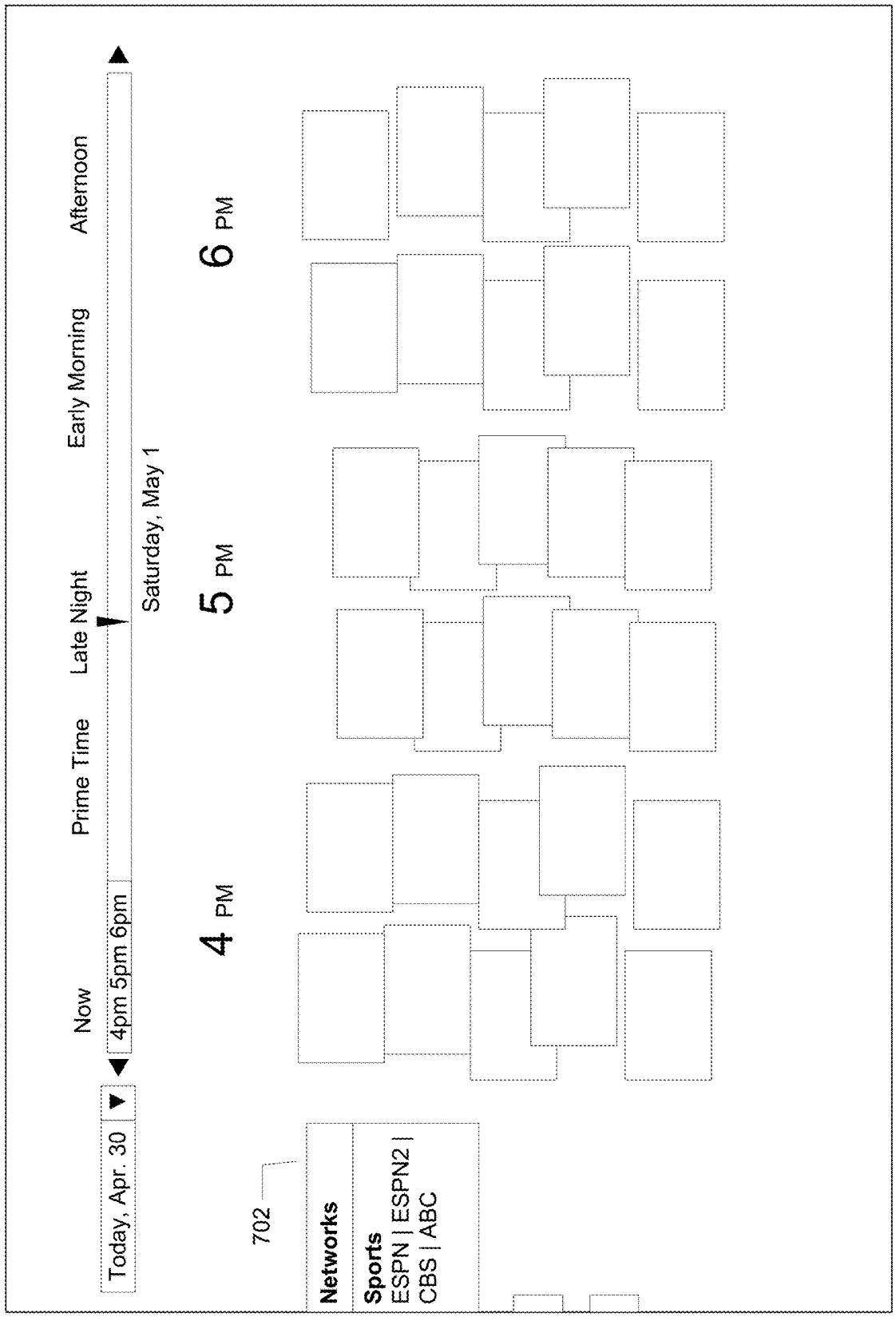

FIG. 7b illustrates a new screen, with the "Sports" group selected. The resulting menu 702 now lists the service providers having sporting events, and the thumbnails may be limited to just sporting events.

Figure 7C:
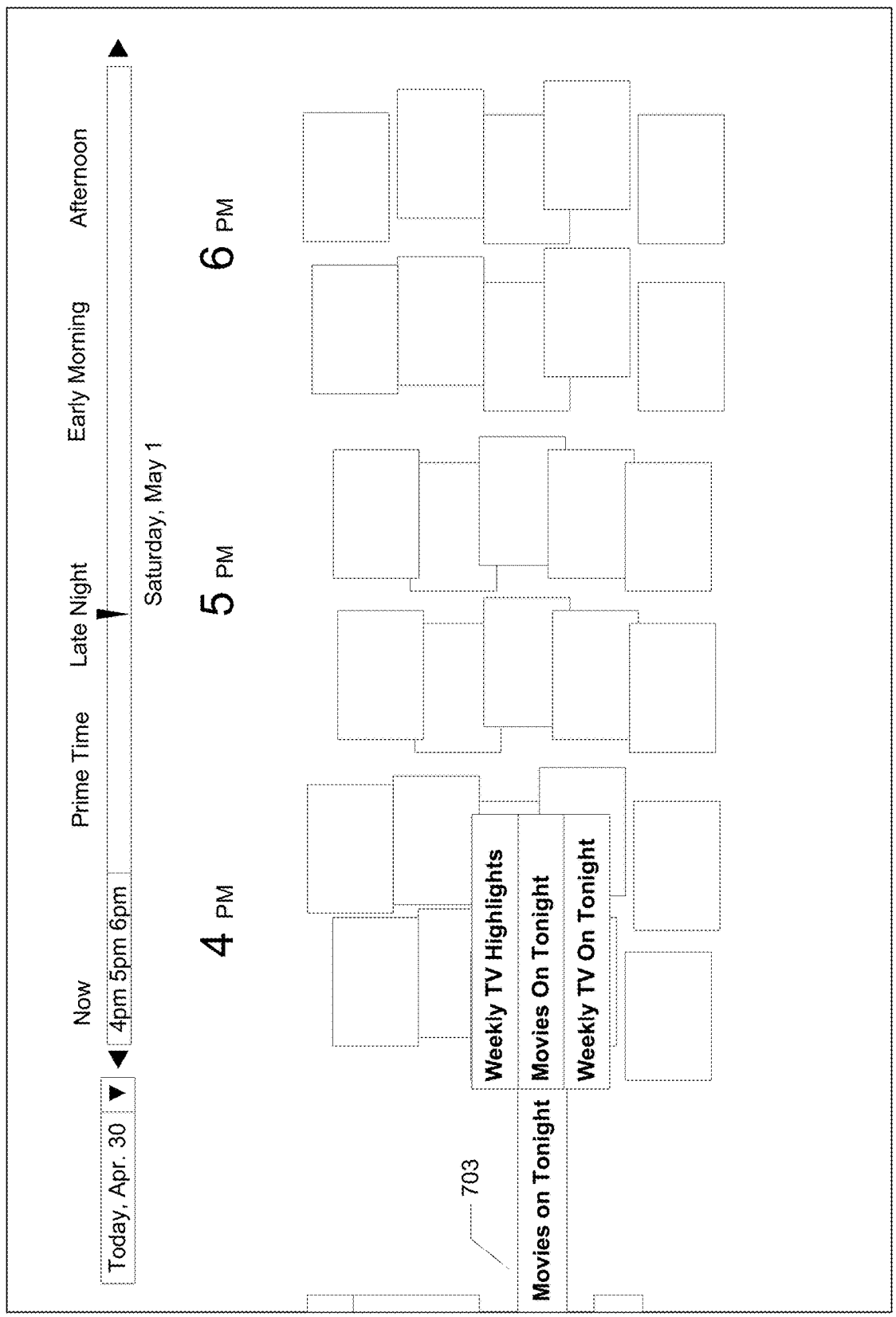
Figure 7D:
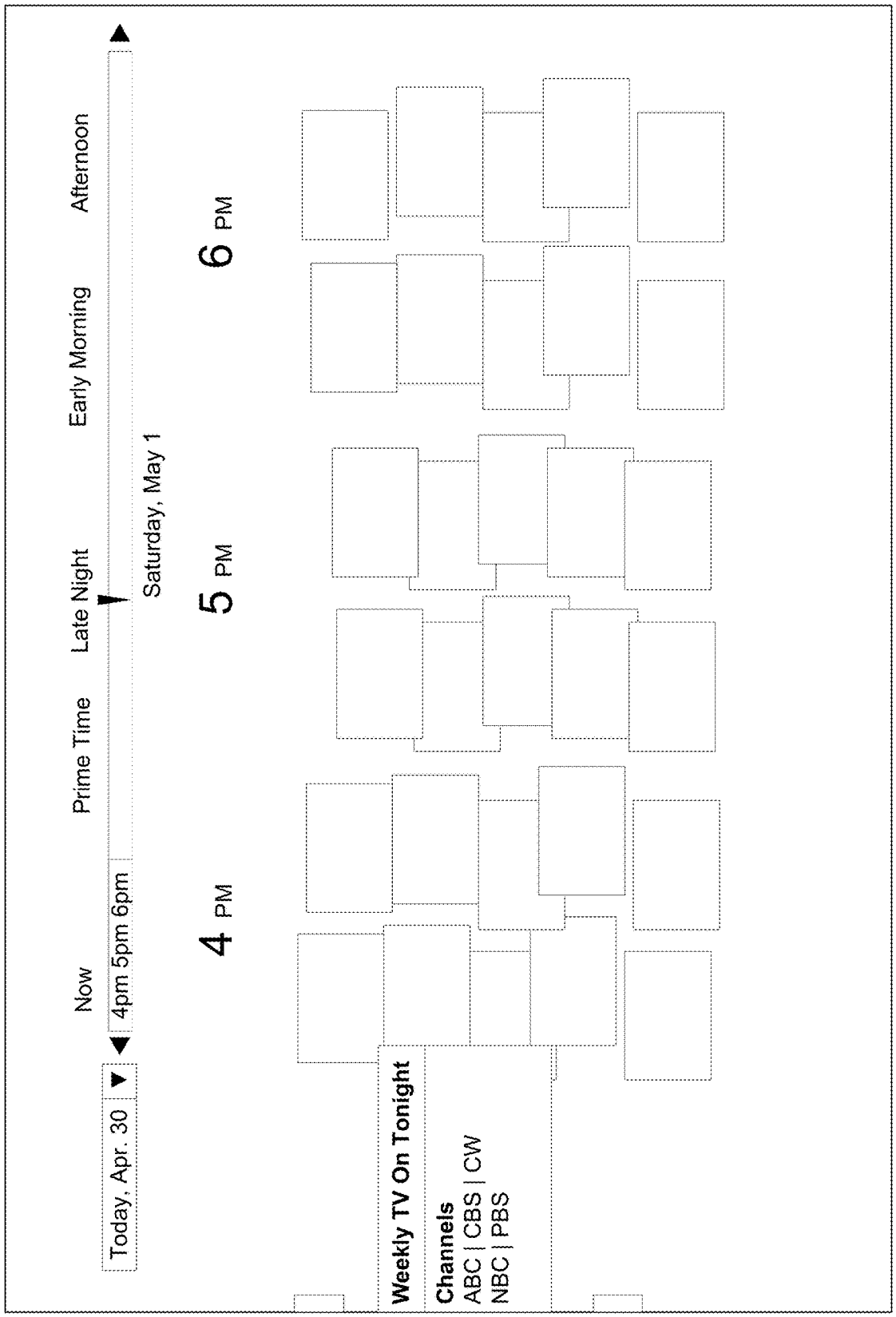

Various other groups can be selected. FIG. 7c shows an expansion of a secondary menu tab 703 (and contraction of the one originally shown in FIGS. 7a & b) to reveal additional groups that are available. The additional groups can be made based on different time windows (e.g., the week, tonight, etc.), different categories (e.g., movies), and on frequency of broadcast (e.g., shows airing nightly or weekly). FIG. 7d illustrates a different listings menu when a different group is selected.

Figure 7E:
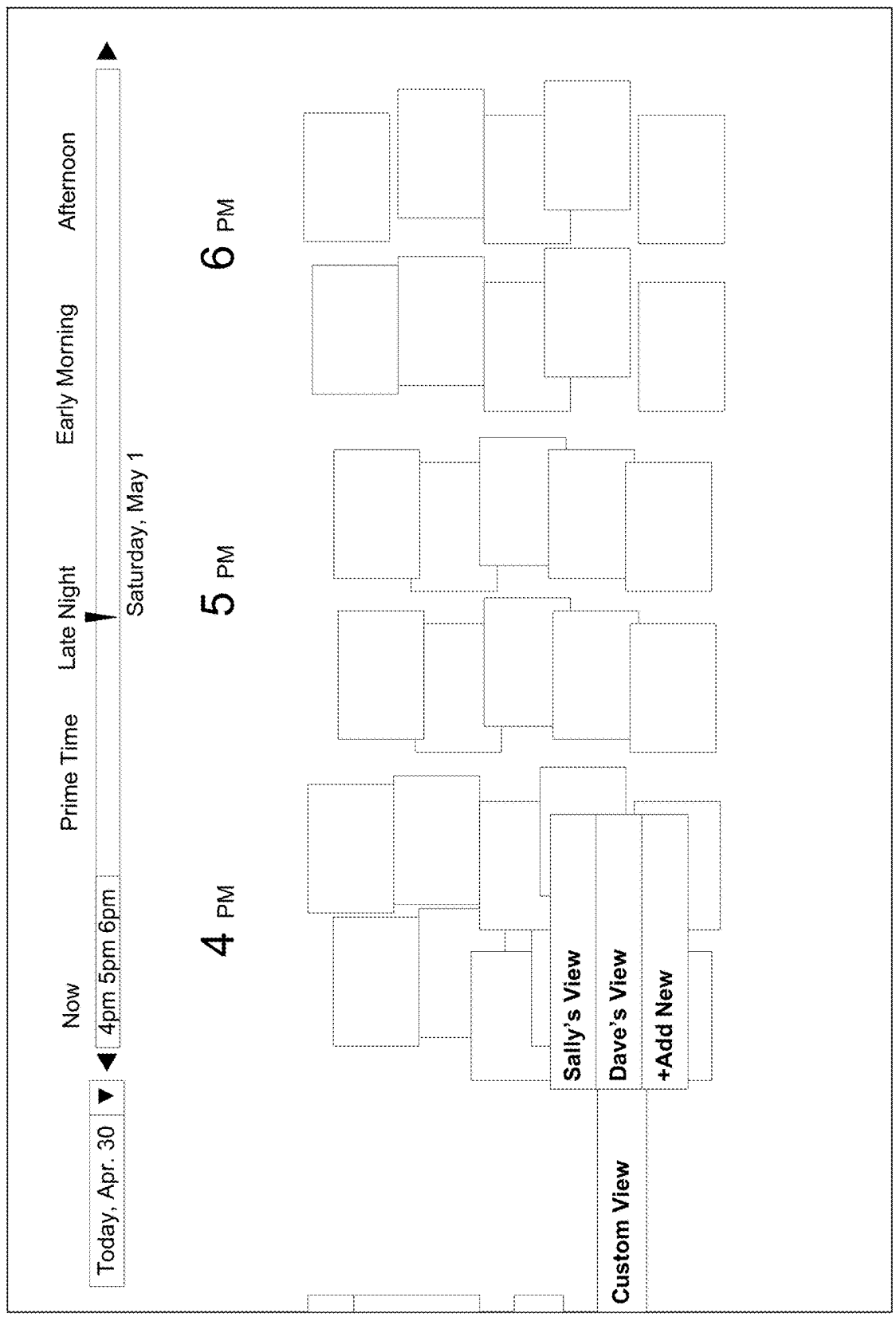
Figure 7F:
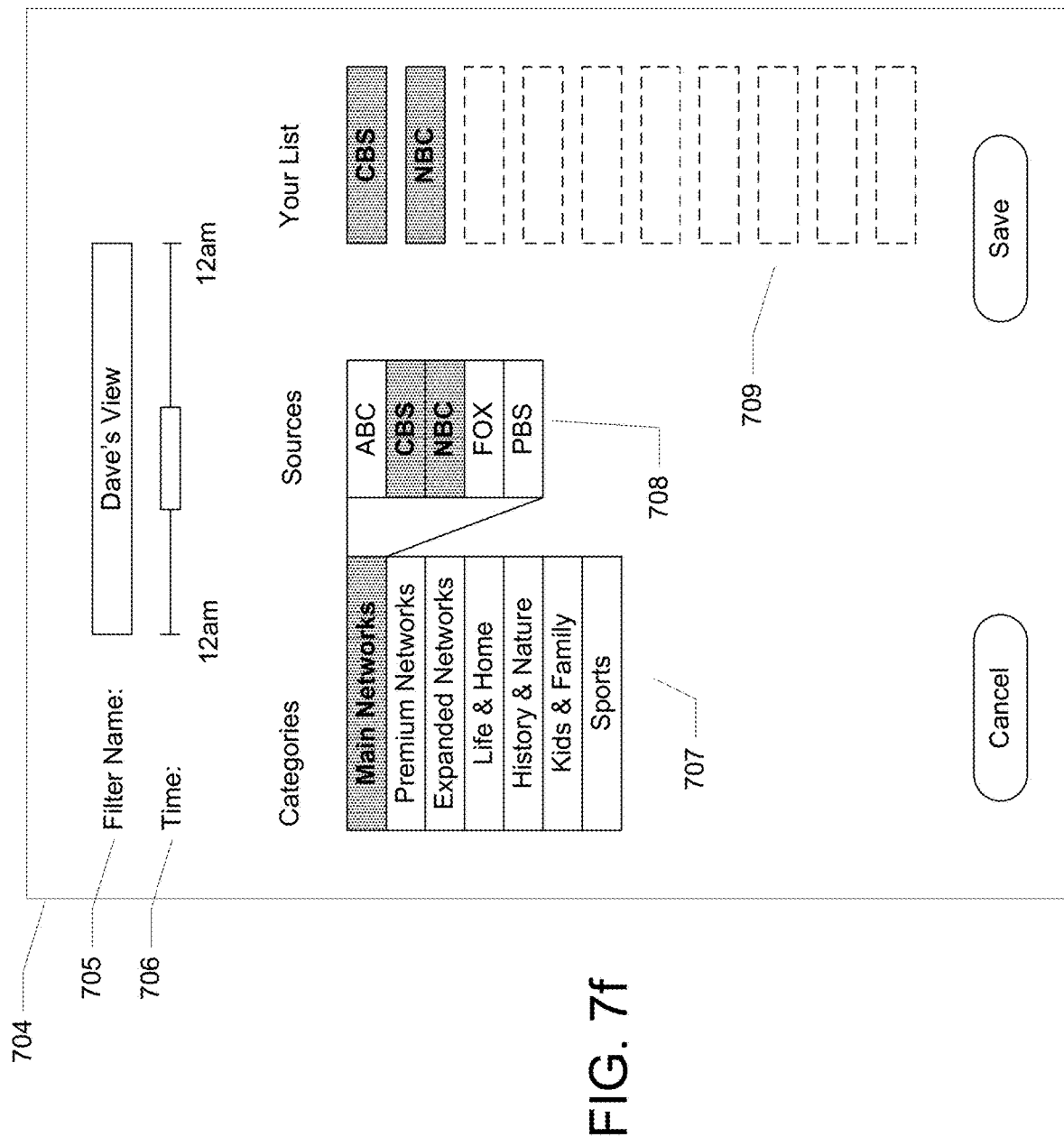

The groupings can be customized by user. So, for example, a user can designate a listing of favorite content providers (e.g., favorite television channels), favorite show titles, favorite program types (e.g., movies, comedies, news), preferred listing time range, etc. for a customized view. This can be done in any desired manner, such as selection through the program guide, and by choosing a custom group, as illustrated in FIG. 7e, the viewer sees a customized listing. FIG. 7f illustrates an example interface 704 for creating a custom view or filter. The interface 704 may include a name element 705, which can allow the user to type in a custom name for the filter being edited or added, and a time element 706 that can allow the user to specify (e.g., by clicking and dragging a box on a timeline) a time range that will be the initial display of listings for this filter. The interface 704 may include categories 707 that, when selected, cause a display 708 of various content sources associated with the selected category. Choosing a displayed source (e.g., by clicking on it with a mouse pointer) may add the source to the list 709 of sources in the current list, and those sources in the list 709 may be what appears when the user chooses the custom view using this filter. The user can choose to save the list when finished, and the resulting filter may be included as an option in the Custom View menu.

Figure 8:
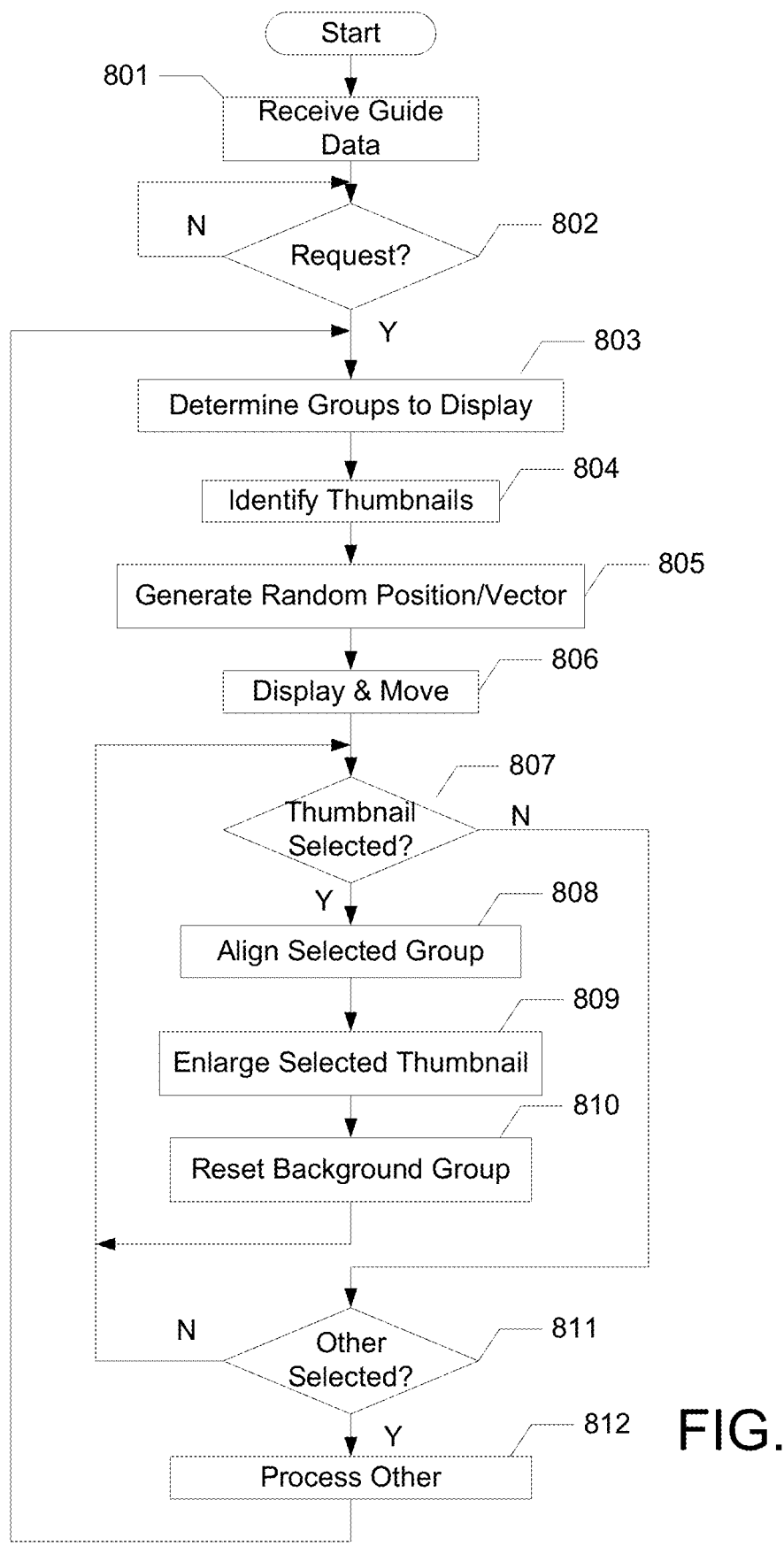
FIG. 8 illustrates an example program guide process.

FIG. 8 illustrates an example process for the display of the program guide. The process may be carried out, for example, by a computing device (e.g., personal computer, set-top box, mobile television, etc.), executing instructions that may be stored in a computer-readable memory, such as storage devices 202-205.

In step 801, the program guide data may be received at the computing device. The program guide data may be initially transmitted from an external server 102 via, for example, a DOCSIS downstream data channel, and received by a consumption device for viewing the program guide, such as a personal computer 104. Alternatively, the program guide data may already be stored in a memory of the computing device.

In step 802, the computing device may determine whether the user has requested to view the program guide. The request can come in any desired manner. For example, the user could access an Internet site offering the program guide, or the user could press a "Guide" button on a remote control. If no request is received, the process may simply await such a request. If a request is received, then the process may proceed to step 803, and determine which groups of thumbnails should be displayed.

The determination of the groups can be done based on a variety of factors. One such factor may be the time of day. The program guide may be configured to initially display thumbnails for programs that are scheduled to be broadcast or multicast at the current time, or for a predetermined amount of time surrounding the current time (e.g., the current hour and 2 hours in the future). Another factor may be the category of thumbnail to be initially displayed. The category may be, for example, the "Main Networks" category of programs discussed above with respect to FIG. 7a.

Once the groups of programs have been determined, the process may identify their corresponding thumbnails in step 804. The thumbnails for the programs in the groups may be video images downloaded along with the underlying program guide code and/or data in step 801.

In step 805, the computing device may generate a random position and a random motion vector for each thumbnail. Similar to that discussed above with respect to FIGS. 3b & c, the random position for each thumbnail may be limited to a predefined area of the display screen, based on the group to which the thumbnail belongs. For example, thumbnails for programs displayed in the 4 pm hour may be positioned within an area designated for that hour, but with a randomized X- and Y-axis offset. A different motion vector may also be generated for each thumbnail. The motion vector may also have X- and Y-components that are randomly adjusted to be different from motion vectors from one or more other thumbnails in the group.

In step 806, the computing device may proceed to display the thumbnails of the selected groups, and begin to move them along their respective motion vectors. As noted above with respect to FIGS. 3*f* & *g*, this motion may include a reversal of motion when the thumbnail reaches a boundary.

In step 807, the computing device may determine whether the user has selected a particular thumbnail. This selection may be made, for example, by hovering a mouse pointer over the thumbnail, or moving a highlight using directional keys on a remote control to highlight the selected thumbnail.

If a thumbnail has been selected, then the device may proceed to step 808, and align the various thumbnails of the selected group. The device may also enlarge the selected thumbnail in step 809, adding information such as title, textual description and start time/date, and reset the thumbnails of the non-selected groups to initial positions with (if desired) new motion vectors in step 810. The alignment, enlargement and resetting may be as described above with respect to FIGS. 4*a-d*.

The process may then return to step 807, to await selection of another thumbnail. If no such thumbnail is selected, the process may proceed to step 811, and determine if any other program guide interface element has been selected. This can include interaction with any other element on the screens, such as the content menus 701, the timeline 601, an "Exit" button to close the program guide, and any other desired element. If no such selection is made, the system can return to step 807, but if a selection is made, the system can proceed to step 812 to process the selection.

In some embodiments, specific commands may be used to directly invoke a function in the program guide. For example, a specific keyboard and/or remote control button (or combination of buttons) may be mapped to a command that opens the program guide, or chooses a time slot (e.g., display "Prime Time" listing upon pressing the "P" key), or schedules a recording (e.g., pressing "R" creates an automatic recording command for a currently selected video program, and causes that command to be propagated to a remote DVR), etc.

The description above is merely an example. Many modifications may be made to adapt a particular situation to the teachings herein without departing from the scope thereof. Therefore, it is intended that the aspects not be limited to the particular embodiments disclosed, but that the aspects include all embodiments falling within the scope of the appended claims.

The invention claimed is:

1. A method comprising:
assigning, by one or more computing devices and based on one or more scheduled transmission times, and to each of a plurality of thumbnail images, one or more starting areas, wherein:
the plurality of thumbnail images respectively correspond to a plurality of video programs, and
each of the plurality of video programs is associated with one or more of the scheduled transmission times;
generating, by the one or more computing devices, an interface comprising the plurality of thumbnail images, wherein each thumbnail image, of the plurality of thumbnail images, is randomly positioned in one of the one or more starting areas assigned to the thumbnail image;
generating, by the one or more computing devices, a corresponding random motion vector for each of the thumbnail images, wherein different random motion vectors are generated for at least two neighboring thumbnail images of the plurality of thumbnail images;
causing, by the one or more computing devices, display and movement of the plurality of thumbnail images according to their corresponding random motion vectors;
receiving, by the one or more computing devices, a selection of a thumbnail image of the plurality of thumbnail images; and
causing, by the one or more computing devices and based on the selection, the selected thumbnail image to cease movement while other thumbnail images of the plurality of thumbnail images continue to move.

2. The method of claim 1, wherein the interface comprises an interface for a content transmission schedule.

3. The method of claim 1, wherein the causing the selected thumbnail image to cease movement is based on determining that an on-screen pointer has been positioned over one of the thumbnail images.

4. The method of claim 1, further comprising:
after determining that an on-screen pointer has been positioned over the thumbnail image:
determining a first group, of the plurality of thumbnail images, to which the selected thumbnail image belongs;
aligning the first group of the plurality of thumbnail images while other thumbnail images of the plurality of thumbnail images outside of the first group are displayed according to their respective random motion vectors; and
after determining that the on-screen pointer has been repositioned over another thumbnail image of a different group other than the first group, displaying the first group according to their respective random motion vectors, and aligning thumbnail images of the different group.

5. The method of claim 4, further comprising:
causing movement of the other thumbnail images outside of the first group according to new random motion vectors after aligning the thumbnail images of the first group.

6. The method of claim 4, further comprising causing movement of the other thumbnail images according to corresponding random motion vectors generated prior to positioning of the on-screen pointer over the selected thumbnail image.

7. The method of claim 4, wherein each random motion vector shares a common origin area on the interface.

8. The method of claim 4, further comprising:
generating new random motion vectors for thumbnail images outside of the first group each time the on-screen pointer is moved to a different one of the thumbnail images in the first group.

9. The method of claim 1, further comprising:
determining an outer thumbnail image display boundary for the interface;
determining that a first one of the plurality of thumbnail images has reached the boundary; and
using a new motion vector for movement of the first one of the thumbnail images that has reached the boundary.

10. The method of claim 9, wherein the new motion vector is in an opposite direction than the random motion vector generated for the first one of the thumbnail images.

11. The method of claim 1, further comprising:
determining that an on-screen pointer has been positioned over the selected thumbnail image; and
causing the selected thumbnail image to be enlarged, and adding textual information to the selected thumbnail image, the textual information including a title of a program to which the selected thumbnail image corresponds.

12. The method of claim 1, further comprising:
causing continuous movement of the plurality of thumbnail images until the selected thumbnail image is selected by a user.

13. A system comprising:
a first device and a second device;
wherein the first device comprises:
one or more first processors; and
memory storing first instructions that, when executed by the one or more first processors, cause the first device to:
assign, based on one or more scheduled transmission times, and to each of a plurality of thumbnail images, one or more starting areas, wherein:
the plurality of thumbnail images respectively correspond to a plurality of video programs, and
each of the plurality of video programs is associated with one or more of the scheduled transmission times;
generate an interface comprising the plurality of thumbnail images, wherein each thumbnail image, of the plurality of thumbnail images, is randomly positioned in one of the one or more starting areas assigned to the thumbnail image;
generate a corresponding random motion vector for each of the thumbnail images, wherein different random motion vectors are generated for at least two neighboring thumbnail images of the plurality of thumbnail images;
cause display and movement of the plurality of thumbnail images according to their corresponding random motion vectors;
receive a selection of a thumbnail image of the plurality of thumbnail images; and
cause, based on the selection, the selected thumbnail image to cease movement while other thumbnail images of the plurality of thumbnail images continue to move; and
wherein the second device comprises:
one or more second processors; and
second memory storing second instructions that, when executed by the one or more second processors, cause the second device to:
detect a user input corresponding to the selection of the thumbnail image; and
send, to the first device, the selection.

14. The system of claim 13, wherein the first instructions, when executed by the one or more first processors, cause the first device to, after determining that an on-screen pointer has been positioned over the thumbnail image:
determine a first group, of the plurality of thumbnail images, to which the selected thumbnail image belongs;
align the first group of the plurality of thumbnail images while other thumbnail images of the plurality of thumbnail images outside of the first group are displayed according to their respective random motion vectors; and
after determining that the on-screen pointer has been repositioned over another thumbnail image of a different group other than the first group, display the first group according to their respective random motion vectors, and align thumbnail images of the different group.

15. An apparatus comprising:
one or more processors; and
memory storing computer readable instructions, that when executed by the one or more processors, cause the apparatus to:
assign, based on one or more scheduled transmission times, and to each of a plurality of thumbnail images, one or more starting areas, wherein:
the plurality of thumbnail images respectively correspond to a plurality of video programs, and
each of the plurality of video programs is associated with one or more of the scheduled transmission times;
generate an interface comprising the plurality of thumbnail images, wherein each thumbnail image, of the plurality of thumbnail images, is randomly positioned in one of the one or more starting areas assigned to the thumbnail image;
generate a corresponding random motion vector for each of the thumbnail images, wherein different random motion vectors are generated for at least two neighboring thumbnail images of the plurality of thumbnail images;
cause display and movement of the plurality of thumbnail images according to their corresponding random motion vectors;
receive a selection of a thumbnail image of the plurality of thumbnail images; and
cause, based on the selection, the selected thumbnail image to cease movement while other thumbnail images of the plurality of thumbnail images continue to move.

16. The apparatus of claim 15, wherein the instructions, when executed by the one or more processors, cause the selected thumbnail image to cease movement by determining that an on-screen pointer has been positioned over one of the thumbnail images.

17. The apparatus of claim 15, wherein the instructions, when executed by the one or more processors, cause the apparatus to:
after determining that an on-screen pointer has been positioned over the thumbnail image:
determine a first group, of the plurality of thumbnail images, to which the selected thumbnail image belongs;
align the first group of the plurality of thumbnail images while other thumbnail images of the plurality of thumbnail images outside of the first group are displayed according to their respective random motion vectors; and
after determining that the on-screen pointer has been repositioned over another thumbnail image of a different group other than the first group, display the first group according to their respective random motion vectors, and align thumbnail images of the different group.

18. The apparatus of claim 17, wherein the instructions, when executed by the one or more processors, cause the apparatus to:
   cause movement of the other thumbnail images outside of the first group according to new random motion vectors after aligning the thumbnail images of the first group.

19. The apparatus of claim 17, wherein the instructions, when executed by the one or more processors, cause the apparatus to:
   cause movement of the other thumbnail images according to corresponding random motion vectors generated prior to positioning of the on-screen pointer over the selected thumbnail image.

20. The apparatus of claim 15, wherein the instructions, when executed by the one or more processors, cause the apparatus to:
   determine an outer thumbnail image display boundary for the interface;
   determine when a first one of the plurality of thumbnail images has reached the boundary; and
   use a new motion vector for movement of the first one of the thumbnail images that has reached the boundary.

\* \* \* \* \*

UNITED STATES PATENT AND TRADEMARK OFFICE
CERTIFICATE OF CORRECTION

PATENT NO. : 10,863,248 B2
APPLICATION NO. : 15/666221
DATED : December 8, 2020
INVENTOR(S) : Thomas Loretan et al.

It is certified that error appears in the above-identified patent and that said Letters Patent is hereby corrected as shown below:

In the Specification

Detailed Description, Column 3, Line 30:
Delete "datasreams" and insert --datastreams--

Detailed Description, Column 6, Line 47:
Delete "301" and insert --300--

Detailed Description, Column 7, Line 16:
Delete "301" and insert --300--

In the Claims

Claim 1, Column 9, Line 56:
After "device", insert --,--

Signed and Sealed this
Fourteenth Day of February, 2023

Katherine Kelly Vidal
*Director of the United States Patent and Trademark Office*